(12) United States Patent
Enghardt et al.

(10) Patent No.: US 8,030,617 B2
(45) Date of Patent: Oct. 4, 2011

(54) DETECTOR ASSEMBLY FOR DETECTING RADIATION WITH ANGULAR RESOLUTION AND METHOD FOR OPERATING SAID ASSEMBLY

(75) Inventors: Wolfgang Enghardt, Radeberg (DE); Gerhard Kraft, Darmstadt (DE); Thomas Wuerschig, Dresden (DE)

(73) Assignee: GSI Helmholtzzentrum Fur Schwerionenforschung GmbH, Darmstadt (DE)

( * ) Notice: Subject to any disclaimer, the term of this patent is extended or adjusted under 35 U.S.C. 154(b) by 0 days.

(21) Appl. No.: 12/374,634

(22) PCT Filed: Jun. 18, 2007

(86) PCT No.: PCT/EP2007/056022
§ 371 (c)(1),
(2), (4) Date: Apr. 30, 2009

(87) PCT Pub. No.: WO2008/009528
PCT Pub. Date: Jan. 24, 2008

(65) Prior Publication Data
US 2010/0006769 A1    Jan. 14, 2010

(30) Foreign Application Priority Data

Jul. 20, 2006 (DE) .................. 10 2006 033 661

(51) Int. Cl.
*G01T 1/20* (2006.01)
(52) U.S. Cl. .................. 250/367; 250/370.05
(58) Field of Classification Search .............. 250/367, 250/370.01, 370.05, 370.06, 390.01, 390.11, 250/390.12
See application file for complete search history.

(56) References Cited

U.S. PATENT DOCUMENTS

| | | | |
|---|---|---|---|
| 4,415,808 A | 11/1983 | Cusano | |
| 5,880,469 A | 3/1999 | Miller | |
| 6,313,465 B1 | 11/2001 | Nittoh et al. | |
| 6,771,802 B1 | 8/2004 | Patt et al. | |
| 7,026,627 B2 | 4/2006 | Fowler, Jr. et al. | |
| 7,435,965 B2 | 10/2008 | Fuchs et al. | |
| 2005/0195932 A1 | 9/2005 | Keyser et al. | |

FOREIGN PATENT DOCUMENTS

| | | |
|---|---|---|
| DE | 102 15 070 A1 | 10/2003 |
| DE | 103 18 416 A1 | 11/2003 |
| DE | 103 30 595 A1 | 2/2005 |
| EP | 1 262 796 A1 | 12/2002 |
| GB | 1446692 | 2/1974 |

OTHER PUBLICATIONS

German Search Report Dated Jul. 20, 2006 based on German Patent Application No. 10 2006 033 661.5-52.
International Search Report based on International Application No. PCT/EP2007/056022; Date of Mailing: Nov. 27, 2007.

*Primary Examiner* — David P Porta
*Assistant Examiner* — Mark R Gaworecki
(74) *Attorney, Agent, or Firm* — Leydig, Voit & Mayer, Ltd.

(57) ABSTRACT

A detector assembly for detecting radiation with angular resolution comprises at least one detector element, which comprises a front face and a rear face, a first detector material and a second detector material between the front face and the rear face, a space between the front face and the rear face of the detector element being filled by a plurality of regions of the first detector material and at least one region of the second detector material and each region connecting the front face to the rear face of the detector element; and radiation incident on the detector element through the front face being collimated by means of the detector materials.

20 Claims, 18 Drawing Sheets

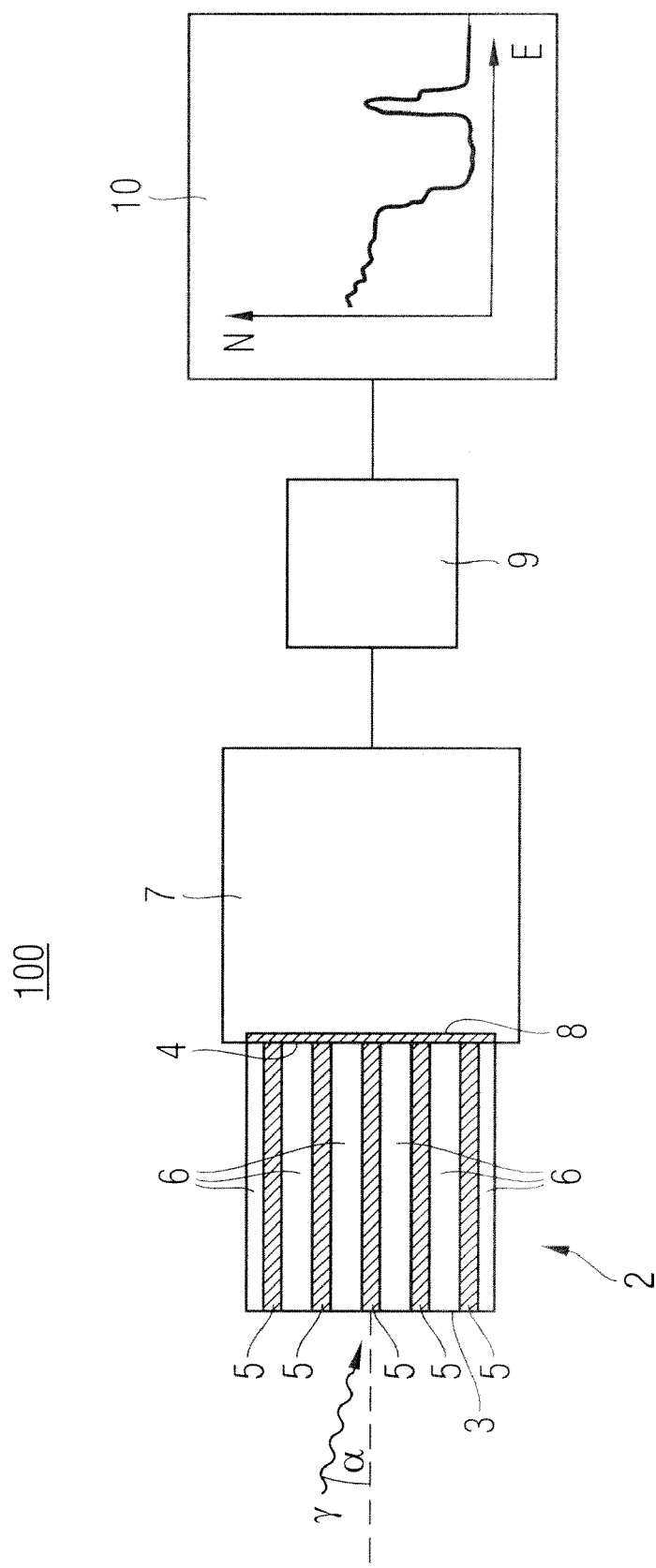

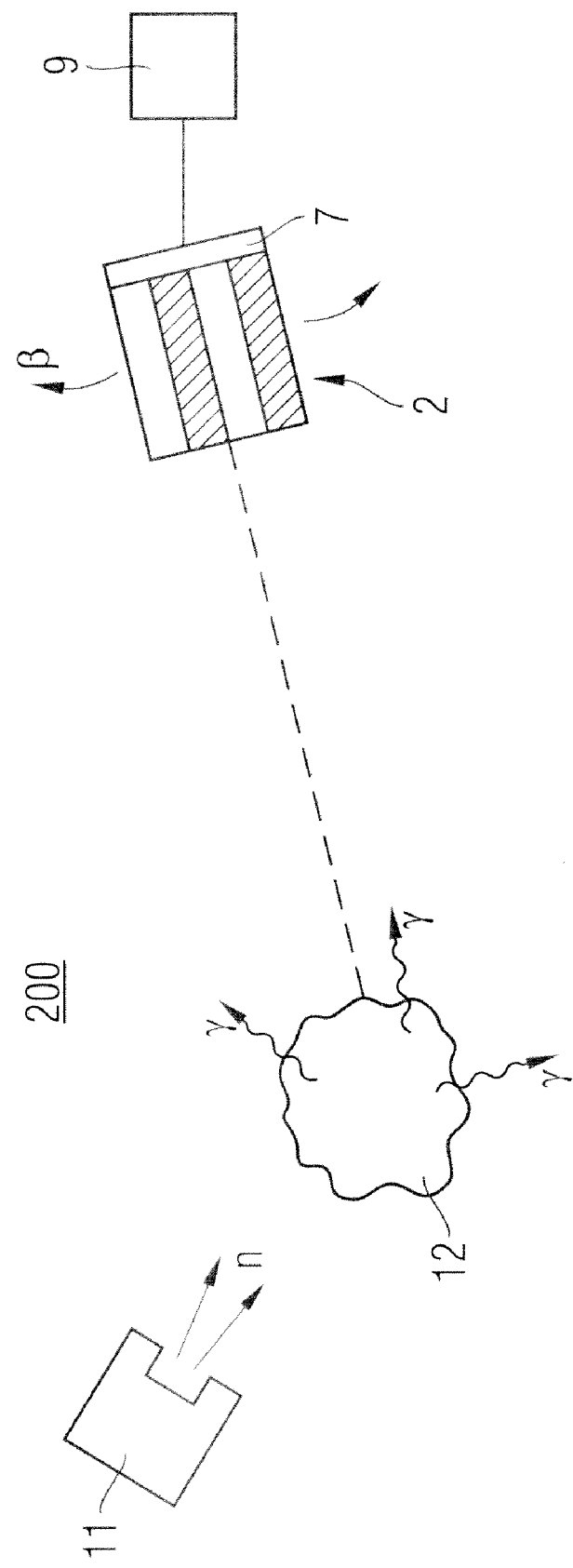

DETECTOR ASSEMBLY FOR DETECTING RADIATION WITH ANGULAR RESOLUTION AND METHOD FOR OPERATING SAID ASSEMBLY

CROSS-REFERENCE TO RELATED APPLICATION

The present application claims the benefit of priority of International Patent Application No. PCT/EP2007/056022, filed on Jun. 18, 2007, which application claims priority of German Patent Application No. 10 2006 003 661.5, filed Jul. 20, 2006. The entire text of the priority application is incorporated herein by reference in its entirety.

FIELD OF THE INVENTION

The present invention relates to a detector assembly for detecting radiation with angular resolution, a method for the operation thereof, and the use of this detector assembly.

BACKGROUND OF THE INVENTION

Nowadays, radiation of highly varied types, such as alpha, beta and gamma radiation, or particles, such as electrons, neutrons, ions or nuclei, are used for the analysis of material samples. Radiation analyses of this type are implemented for example in the localisation and identification of dangerous substances, for example concealed explosives, but also in the field of medicine in combination with imaging methods, in radiation measurement or in research on the structural analyses of materials. In this case, radiation detectors which make it possible to establish the direction of incidence or the origin of the radiation to be detected are in particular required.

In the methods used to date, incident radiation to be detected was initially collimated by hole or lamella collimators in front of the actual detector material. Usually, a hole collimator of this type is formed from a plate of a material with a high atomic number, for example lead, tungsten, iron or brass, which plate is provided with a plurality of holes of a small diameter. In this way it is possible for example for only the gamma rays passing through the corresponding collimator subsequently to be recognised by a detector.

In this case a low sensitivity of the detector is a drawback, in particular at high radiation energies, because only the gamma rays which are incident parallel to the axes of the holes or at a small aperture angle are to be used in the evaluation. Therefore, the wall thickness between the collimator holes must always be greater than the absorption length of the radiation to be detected. In particular for photons with energies of more than 200 keV, the necessary wall thickness between the collimator holes may exceed the diameter of the holes. The transmission, i.e. the cross-sectional area of all collimator holes in relation to the total face area (front face) of the respective detector, will then be low. The absorbing cross-sectional area then actually exceeds the penetrable surface area of the collimator. The higher the energy of the particles or radiation to be detected, the more unfavourable the transmission becomes and the lower the probability of the respective detector responding. This applies in particular to high energy gamma radiation. Alongside the aforementioned collimator-based detectors, detection methods which detect direction without collimation are also known, such as the Compton camera or the positron camera in positron emission tomography (PET).

The principle of the Compton camera is that instead of the aforementioned mechanical collimation, an electronic collimation is performed to determine the direction of radiation incident on the corresponding detector system. A radiation photon incident in a Compton camera thus initially passes through a first scattering detector in which Compton scattering takes place. If the scattering detector is configured in a granular manner, the location of the interaction will be detected. In a second absorption detector at a distance, the scattered photon is completely halted, it being possible to record the location and the energy. If the two scatterings in the scattering detector and absorption detector are shown to be coincident, then the position of the radiation source which emitted the photon can be reconstructed on a cone surface with the apex at the location of the scattering detector. The location of the radiation source can be determined by means of suitable tomographic reconstruction algorithms. This principle is primarily used in astrophysics for the measurement of gamma radiation sources with photon energies of up to 30 MeV.

A drawback is that the scattering detector must be very thin so that at most one Compton interaction takes place therein. This substantially reduces the probability of an interaction in the detector. Furthermore, complete energy deposition of the photon energy in the absorption detector must be ensured, and in real detector systems this is always achieved only for a fraction of the incident photons. This reduces the efficiency of the Compton camera.

Locating explosives, for example landmines in a cleared area or concealed explosives in luggage or cargo, is a particular field of application of detectors which use bearing resolution.

Explosives generally have a high concentration of nitrogen compounds. The recognition of these nitrogen accumulations must generally take place in the environment of other lighter atoms, such as organic compounds and plastics material, sand or earth, which are part of the soil in the case of landmines or which form the main component of the container to be analysed. These materials primarily comprise light elements, such as carbon (C), nitrogen (N), oxygen (O), fluorine (F), silicon (Si), magnesium (Mg) etc., which emit high energy gamma quanta or gamma radiation under neutron excitation (activation with neutrons). Conventionally, for example at airports, transmission X-ray devices are used for luggage inspection. However, no element-specific signal is detected in this way, explosive devices being detected only on the basis of their shape in the X-ray image.

X-ray backscattering detectors and methods which employ neutrons are proposed for the detection of landmines in the ground, for example in "Detection of buried landmines and hidden explosives using neutron, X-ray and gamma-ray probes", G. Nebbia and J. Gerl in europhysics news, July/August 2005, pages 119 ff. In this case, backscattered neutrons or gamma quanta from the neutron capture, for example, are measured with scintillation counters. This generally requires high-volume detector assemblies which must be moved close to the ground. This does not allow the detection of the direction of the gamma source, produced for example by neutron activation, relative to the detection system above the ground.

A further difficulty is the identification of individual emission lines, which are characteristic for example of nitrogen or other characteristic material or element compositions, from a measured intensity spectrum in order to detect the presence of explosives. Disadvantageously, this requires energy-resolving spectroscopy with a high energy resolution. This involves a high technical expense and leads to lower reliability of the relevant detector.

It is therefore an object of the present invention to provide an improved detector assembly which allows radiation to be detected with angular resolution. A further object of the invention is to determine the presence of predetermined materials from the spatially detected radiation.

SUMMARY OF THE INVENTION

This disclosure provides for a detector assembly and a method for the detecting radiation with angular resolution using the detector assembly.

Accordingly, a detector assembly for detecting radiation with angular resolution comprising at least one detector element is provided, the detector element comprising a front face and a rear face, a first detector material and a second detector material between the front face and the rear face. A space between the front face and the rear face of the detector element is filled by a plurality of continuous regions of the first detector material and at least one continuous region of the second detector material, and each region connects the front face to the rear face of the detector element. The regions are arranged in such a way that each region of the first detector material borders on at least one region of the second detector material. According to the invention, an energy deposition takes place in at least the regions of the first detector material as a function of the angle of incidence of the radiation on the detector element.

In the following, a detector material is understood to mean any material which fills the respective geometric shape of the first and/or second regions of the detector element. In particular embodiments of the invention, the respective first and/or second (detector) material has predetermined physical properties, such as absorption properties with respect to particular radiation, scintillator properties or the like. It is preferable for one of these detector materials to be an active material which delivers a signal, for example scintillation light, when it is struck by a gamma quantum. The other detector material may in this case also be an active material, or act as a passive material, i.e. an absorber material for the relevant radiation or quanta, and in the latter case produce no signal upon the incidence of radiation.

Photons arriving in the detector element through the surfaces or walls which delimit said detector element interact with all particles or materials present in the detector element. The photons, for example high energy gamma quanta, then release all or usually part of their energy and produce electrons inter alia via the Compton effect. These electrons are produced at all penetration depths of the photons and emitted towards the front, i.e. in the direction of the respective incident photons, with increasing photon energy. Further scatterings of these primary electrons with the electrons of the respective detector material transfer the energy into the detector element. In these scattering processes, the original (forwards) direction of the photons incident on the detector element is predominant, said direction being determined by the trajectory of the respective primary photon.

In the case of a frontal incidence on the front face of the detector element, it is possible for the incident photon to deposit the whole of the majority of its energy via a cascade of secondary scatterings in a single one of the regions of the detector element. The arrangement of the regions of various detector materials therefore provides a preferred direction. The detector materials themselves thus collimate photons arriving in the detector element through the front face within the detector element according to the invention. In this case, the collimation depends on the shape of the regions. The angle of incidence may for example be defined relative to the front face, the preferred direction of the regions or other suitable distinctive directions.

In one embodiment of the detector assembly according to the invention, the regions are formed as layers of the first detector material and the second detector material. This results in alternating layers of the first and the second detector material, allowing a preferred plane to be defined through the planes of the layers in the direction of the front face of the detector element. The preferred plane in the direction out through the front face of the detector element then represents a preferred direction of the detector element. In the following, the terms radiation, quanta and particles (which are to be detected by the detector assembly) are used synonymously. The invention is preferably applied to the detection of high energy gamma radiation.

If the forward direction of the gamma quanta lies in the same plane as (is collinear with) the preferred direction of the detector element resulting from the lamination in layers, i.e. the front face of the detector is facing the radiation source, then the secondary electrons are emitted in the direction of the respective plate or layer planes. These secondary electrons are then less likely to strike the respective upper or lower sides of the plates, where they leave the respective region of the detector element and may possibly be absorbed in the other detector material. This means that the secondary electrons have a greater chance or probability of releasing the whole of their energy in the detector material of a plate or of a single region. In this case, a signal produced by the detector material corresponds to the whole of the energy of the electrons. This results for example in a spectral form specified by a Compton distribution.

If a gamma quantum arrives through the front face at an angle to the plane of a layer, deposition processes take place in the direction of incidence in a plurality of regions or layers. The energy deposition by secondary electrons in an individual one of the detector materials thus depends strongly on the angle of the incident particle with respect to the plane of the layer. It is thus possible with the detector assembly according to the invention to derive at least one angle between a preferred plane, specified by the shape of the regions, and the direction specified by the connection between the detector element and the radiation source. With a further detector element, a second angle may further be determined. It is therefore in principle possible to calculate an azimuth angle and a polar angle for determining the direction of the radiation source based on the position of the detector assembly.

In a preferred embodiment, at least the regions of the first detector material are formed of a polyhedron or a cylinder with a base area and a height such that the base surfaces border on the front and rear faces of the detector element. The polyhedra are preferably formed as prisms. In this embodiment, not only does the detector assembly according to the invention allow a preferred plane for the detection of radiation, but a preferred direction, corresponding to the axis of symmetry of the polyhedra or cylinders in the direction of the front face, may be defined.

The first detector material preferably comprises an active detector material, in particular a scintillator material, which provides a detectable signal when passed through by a photon. The regions of the second detector material preferably have an absorption effect on radiation or particles passing through the detector element. Pure absorption materials are therefore used for the second regions. The second detector material may for example comprise iron, air, lead and/or aluminium.

Particles which arrive in the detector element at an angle which is greater than a boundary angle with respect to the preferred plane or the preferred direction deposit energy, for example alternately, on the one hand in the scintillating detector material, in which case it is possible to detect the energy as light, and on the other hand in the absorbing material. The integral energy deposition for radiation or particles of a particular energy which are to be detected thus depends strongly on the angle of incidence based on the preferred plane or direction.

In a development of the invention, the second detector material also comprises scintillator material. An "interleaved detector" of this type has an active detector material in the first regions and an active detector material in the second regions, it being possible to read these separately. The detector materials work reciprocally as absorbers for the other respective regions.

Scintillator material is preferably used as an active detector material for the first and/or second detector material. If both regions comprise scintillator materials, which are different or even the same but read separately, an improved directional or angular resolution is possible by means of a coincident evaluation of the energy deposited in the two materials.

In a development of the detector assembly according to the invention, the detector element comprises a preferably energy-resolving light measurement means, which is coupled on the rear side at least to the regions of the first detector material and which detects scintillation light. The light measurement means in this case preferably detects the scintillation light from all regions of the first detector material integrally. A light measurement means, for example a photomultiplier, or even another signal analysis means, thus measures the energy deposited in the scintillating regions. A pulse-height spectrum of the deposited energy may thus be established. Because the count rates for deposited high energy and low energy behave differently or change for different directions of radiation of the gamma quanta with respect to the preferred direction of the detector element, the angle or the direction of the corresponding radiation source relative to the detector element may be derived, the detector element being rotated in steps by small angles.

In an alternative embodiment, the regions of the first and/or second detector material each form a semiconductor detector, making it possible to read electrical signals. If regions are configured as semiconductor detectors, the incident photon radiation produces free charge carriers, which may be evaluated as rapid electrical signals. If semiconductor detectors are used, no additional light measurement means is necessary.

The detector element is preferably rotatable about at least one axis of rotation, the axis of rotation extending substantially perpendicular to a connection between the front face and the rear face. It is thus possible to direct the preferred plane or direction of the detector element directly towards a radiation source by rotating the detector element. If, for example, the detector element is rotated up or down (by a polar angle) or left or right (by an azimuth angle) relative to a line connecting the gamma source and, for example, the centre of gravity of the detector element, then the conditions change for the energy deposition, in the regions of the detector element, of the secondary electrons, the plane of movement of which is an extension of the direction of rotation. In this case, there may for example be a lamination in layers of different detector materials in the horizontal plane, i.e. with the polar angle $\pi$.

The detector materials preferably react to gamma rays, in particular in an energy range in which the absorption of the gamma radiation is dominated by the Compton effect. In an energy range from 500 keV to approximately 10 MeV, the Compton effect is the predominant interaction of the radiation incident on the detector with the detector material. The maximum energy transfer occurs in scatterings in which the gamma quantum and the Compton electron escape in substantially the same direction. Corresponding gamma energies result inter alia from the activation of material samples with neutrons. In this case, the material to be analysed is bombarded with neutrons and then emits gamma quanta.

In a development of the detector assembly according to the invention, a neutron source is therefore provided for irradiating a material sample with neutrons.

The neutron source produces the neutrons by alpha radiation for example. Conventionally, beryllium nuclei are bombarded with alpha particles and decompose into carbon and neutrons. This results in neutrons in a continuous spectrum up to approximately 14 MeV.

The neutron source preferably produces neutrons by means of accelerated protons, deuterons, helium ions, alpha particles or tritons, which are shot at a target.

In a further preferred embodiment, the neutron source comprises a piezoelectric crystal. By means of piezoelectrics having pyroelectric properties, it is possible for example to generate high voltages for the production of deuterium nuclei, which are shot at a target containing deuterium. In the corresponding nuclear reaction, $^3$He, neutrons, electrons and gamma radiation are produced. An appropriate neutron source can be made very small and has been described, for example, in nature 434, 1115-1117 (28 Apr. 2005): "Observation of nuclear fusion driven by a pyroelectric crystal" B. Narnajo et al.

Preferably, neutron production may further be controlled by the neutron source.

In a further embodiment, an excitation radiation source is provided and irradiates a material sample in such a way that nuclear reactions are produced in the material sample. A small proton accelerator is conceivable for example.

In a development of the invention, the detector assembly comprises a plurality of detector elements, the detector elements being arranged in such a way about a position on a material sample that the front faces are at a non-vanishing angle to one another. This angle between the front faces may for example be selected so as to be greater than 180° if a large area is to be scanned (divergent collimation). It is also conceivable for the angle to be set so as to be smaller than 180° if a single object is to be analysed (convergent collimation).

In this case, rotation of a detector element is not necessary, because different angles of incidence of the gamma quanta result from the same source since the positions, which are rotated relative to one another, of the front faces or preferred directions of the detector elements. For example, the preferred directions of the planes of the detector elements may be positioned about a material sample in such a way that tomographic reception is possible. The application of tomographic reconstruction methods is particularly appropriate.

An evaluation means, which is coupled to the regions of the detector element and/or to the light measurement means and which evaluates signals, is preferably also provided. In this case, the evaluation means preferably detects a distribution of the energies deposited in the detector materials or an energy spectrum.

Further, a method for detecting radiation with angular resolution using a detector assembly according to the above with the following method steps is provided:

a) Recording a spectrum of the energy in a first energy range deposited in the first detector material;

b) Rotating the detector element by at least one angle of rotation and performing method step
a) for the respective angle of rotation; and
c) Comparing the energies in the first energy range recorded for different angles of rotation.

Energy deposited in the first detector material is preferably recorded in at least a second energy range for different angles of rotation, and the energy recorded in the respective energy range is compared for different angles of rotation.

In this case, an energy range is also understood to mean, for example, a complete spectrum with low and high energies reaching as far as the detection limits of the respective detector.

When the detector element rotates by an angle of rotation, the count rate and the deposited energy in the various energy ranges change. These detection characteristics depend on whether the preferred direction of the detector element is rotated towards or away from the radiation source. For a higher energy part of the spectrum, the respective count rate or intensity in the spectrum decreases when the detector or the preferred direction thereof is moved away from the radiation source. The number of events recorded in the lower-energy part of the spectrum simultaneously increases.

Preferably, a preferred angle of rotation, for which the energy deposited in the first and/or second energy region is a maximum or a minimum, is established. Then, a direction of the radiation source relative to the detector element can be determined based on the preferred angle of rotation.

This disclosure further provides an alternative method for detecting radiation with angular resolution using a detector assembly according to the invention with the following method steps:
a) Recording a spectrum of the total energy deposited in the first detector material;
b) Determining a first energy deposited in a first energy range;
c) Determining a second energy deposited in a second energy range; and
d) Comparing the first deposited energy with the second deposited energy.

As the angle relative to the preferred direction increases, the height of the Compton edge is modulated and the edge is displaced in the direction of lower deposited energies in a corresponding spectrum for the energies deposited in the detector material. This displacement may be detected in accordance with the invention by comparing the deposited energies in various energy ranges.

The first energy range is preferably provided in such a way that a Compton edge falls in the first energy region in the recorded spectrum. This allows a displacement of the Compton edge, caused by a change in the angle of incidence of the radiation on the detector element, to be detected easily.

The distance between the two energy ranges is preferably selected as a function of an energy resolution of the detector element.

The spectrum is advantageously recorded by measuring a distribution, as the function of the respective deposited energy, of the events in which energy is deposited in the first detector material.

In a development of the method according to the invention, a step in which a material sample is activated by irradiation with neutrons is further provided.

A step is further preferably provided for determining a direction parameter from the ratio of the first and second deposited energies. The direction parameter is preferably determined for different detection directions, the respective detection directions being substantially normal to the front face of the detector element. A direction of the radiation source relative to the detector element is then established from the direction parameter.

In a development of the method according to the invention, a step is furthermore provided for determining a third energy deposited in a third energy range.

In this case, the energy ranges preferably do not overlap.

According to an aspect of the invention, a first, second and third colour parameter are preferably assigned to the three deposited energies. Analogously to human colour vision, the intensity of the deposited energy is thus used for at least three energy ranges, or wavelength or frequency ranges. The first deposited energy determines the first colour parameter, the second deposited energy determines the second colour parameter, and the third deposited energy determines the third colour parameter.

According to another aspect of the invention, a decision is then made as to the presence in the material sample of a material being searched for, preferably in dependence on the colour parameters. In this case, a predetermined combination of colour parameters is for example assigned to a material being searched for.

When activated with neutrons, the activated material generally emits characteristic spectral lines, which usually require a high energy resolution of the detector employed so as to be detected. According to the invention, the gamma emission spectrum of a known material which is to be detected is divided into the three energy ranges and corresponding reference colour parameters are predetermined. By comparing the detected combination with these predetermined colour parameters, it is then possible to identify the material being searched for from the colour parameters, determined in accordance with the invention, of the spectrum of the deposited energy in the detector element.

In this case, volumes may for example be established in a three-dimensional colour parameter space. If a vector determined in accordance with the invention, formed from the three colour parameters, falls within a volume of this type, then the material being searched for can be considered to have been recognised.

In a particularly advantageous development of the method according to the invention, a detector element in which the first and second regions comprise active and separately readable detector materials is used. In this case, the energies determined for the first, second and third energy ranges and deposited in the first and second detector materials are then added. Total signals are thus formed from the initially separately read signals for the colour parameters in the different energy ranges. This allows the material analysis by analogy with colour vision to be performed even more reliably, because it is possible to achieve an improvement in the data by a factor of two. The separately read signals of the first and second regions are simultaneously separately used for the directional analysis.

The disclosure further provides for a use of the detector assembly according to the invention for the detection of explosives in material samples which are to be analysed, or in clearing landmines. The use for the detection of nitrogen-containing materials, such as explosives, in luggage or cargo inspection is particularly advantageous.

Further advantageous configurations and developments of the invention are the subject-matter of the sub-claims and the embodiments described below.

BRIEF DESCRIPTION OF THE DRAWINGS

In the following, the invention will be described in greater detail, by way of example, by means of preferred embodiments and example embodiments, with reference to the drawings, in which:

FIG. 2 shows a first embodiment of the detector assembly according to the invention;

FIG. 10 shows a second embodiment of the detector assembly according to the invention;

In the figures, like or functionally identical elements have been provided with the same reference numerals unless otherwise specified.

DETAILED DESCRIPTION OF EMBODIMENTS

Figure 1:
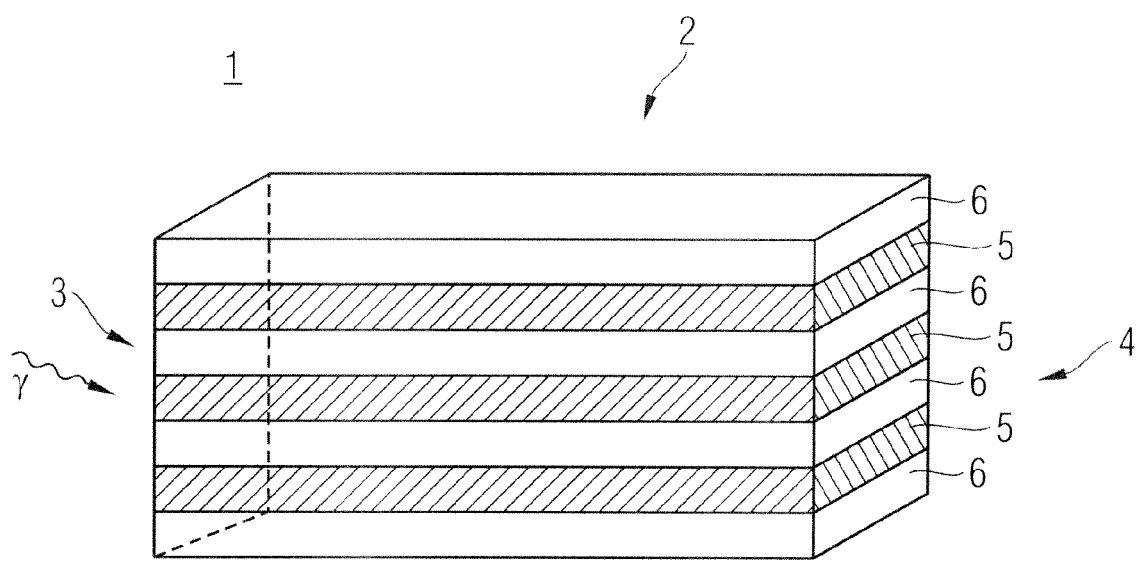
FIG. 1 shows a detector element according to the invention.

In the figures, like or functionally identical elements have been provided with the same reference numerals unless otherwise specified.

FIG. 1 shows a detector assembly 1 with a detector element 2 according to the invention. In the embodiment according to FIG. 1, the cuboid detector element 2 comprises a front face 3 and a rear face 4. In this case, gamma rays γ arrive in the detector element 2 substantially through the front face 3.

Alternating layers 5, 6 of a first detector material and a second detector material respectively are provided. These layers 5, 6 connect the front face 3 to the rear face 4. For example, the layers 5 are manufactured from an absorber material for Compton-scattered electrons and the layers 6 are manufactured from a scintillator material.

The light emission produced by the scintillator material is preferably measured at the rear face 4 of the detector element. From the amount of light measured, or the energy deposited in the layers 6 which comprise scintillator material, it is possible to determine the direction of incidence of the radiation γ relative to a preferred direction or plane of the detector element 2. In the detector element 2, which in this case is formed for example from layers 5, 6, a preferred plane through the planes of the layers is specified.

FIG. 2 shows an expanded detector assembly 100. The detector element 2, which is constructed from layer-like regions, comprises alternating layers 5, 6 of absorbing and scintillating detector material, a front face 3 being directed substantially in the direction of a radiation source for gamma radiation γ. To the rear face 4 a photomultiplier 7 is coupled, which integrally detects scintillation light from the layers or regions 6. In this case, a photocathode 8 lies against the rear face of the detector element 2.

An evaluation means 9 reads the appropriate signals from the photomultiplier 7 and generates, in particular, a spectrum for the deposited energy in the scintillator material of the detector regions 5. The evaluation means 9 may for example be embodied as a computer which is connected to the photomultiplier via a suitable interface, and which performs a pulse-height analysis on the events detected. In the process, the events in which energy is deposited in the scintillator material are counted and recorded as a function of the deposited energy. According to the invention, the direction or the angle of the preferred direction of the detector element relative to the respective gamma radiation source is determined from the form of the recorded spectrum, and also, the elemental composition of the respective gamma radiation source is decided on or the detector element is turned and/or rotated in such a way that the direction of the radiation source relative to the front face can be determined from the change in the readable signals as a function of the respective position of the detector element.

FIG. 2 shows the angle of incidence α between the preferred direction or plane of the detector element and the forwards movement of the gamma quanta. This angle is also the preferred angle of the direction of escape of the electrons when high energy gamma quanta are incident. According to the invention, the radiation to be detected is collimated in the detector material itself. A complex collimator for the detector element 2 is not required.

When detecting the gamma radiation which is produced by materials activated by neutrons, energies of gamma quanta of more than 500 keV are typically involved. When detecting photons of this type in detector materials, the energy of the photon is generally not completely transferred to electrons, and is also transferred to electron-positron pairs when a threshold energy of $E_\gamma = 1022$ keV is exceeded.

In the following, the functioning of the detector element according to the invention or of the detector assembly is explained by means of Compton scattering with average energies between 100 keV and 10 MeV, at which a partial transfer of the gamma energy takes place. Complete energy transfer is predominant at lower energies $E_\gamma < 100$ keV via the photoelectric effect and at higher energies $E_\gamma \gg 1$ MeV via pair production. At low gamma energies, the electrons produced are emitted at high lateral angles relative to the direction of the photons. The higher above the respective reaction thresholds the photon energy lies, the more the electrons or even positrons are scattered in bundles at forwards angles, i.e. in the direction of the gamma photons. As the energy of the radiation to be detected increases, the secondary electrons or positrons are also increasingly scattered forwards, as is the case for all absorption processes, such as the photoelectric effect, the Compton effect, and pair production. The electrons produced by the gamma photons can be decelerated easily, i.e. over a short distance, in a solid body. It is therefore easier to achieve collimation or direction-sensitive reading of the corresponding signals.

According to the invention, the direction selection takes place by means of the geometry of the various detector regions, which are formed so as to be laminated, for example, as layers or plates, as is shown in FIGS. 1 and 2, the layer thickness being selected so as to be less than the average electron range. Because only a fraction of the energy is transferred to the detector via the predominant Compton scattering process, this typically results in plate thicknesses of 1-2 cm. The detector plates should be separated from one another in such a way that an electron does not cause a signal in two different plates. This may for example be achieved in that the individual plates are separated from an active detector material by passive absorber layers. With strong absorbers such as lead or iron, layer thicknesses of a few millimetres are generally sufficient.

The detector assembly according to the invention is suitable in particular for the energy range between 500 keV and 10 MeV, in which the Compton effect is predominant. However, it may also be applied even if just a few gamma lines lie above the Compton energy range. For example, in particular, the nitrogen line at 10.8 MeV can be detected. The physical processes and detection methods described below are explained in detail by means of the Compton effect, but are also suitable for application in other energy ranges. The Compton effect results in a fixed relationship between the angle of incidence of the photon and the direction of escape of the Compton-scattered electron produced. The energy $\Delta E$ transferred from the photon to the Compton electron is dependent on the scattering angle. The maximum energy transfer $\Delta E_{max}$ results for a scattering at 180° or $\pi$. The Compton-electron then continues to move in the same direction as the incident photon with the energy $E_{max}$. The maximum energy transfer results as $$\Delta E_{max} = E_{max} = E_\gamma \frac{2\varepsilon}{1+2\varepsilon}. \quad \text{(Equation 1)}$$

Where $$\varepsilon = \frac{E_\gamma}{m_e C^2},$$

and $m_e c^2$=511 keV corresponds to the rest mass of the electron.

Figure 3A:
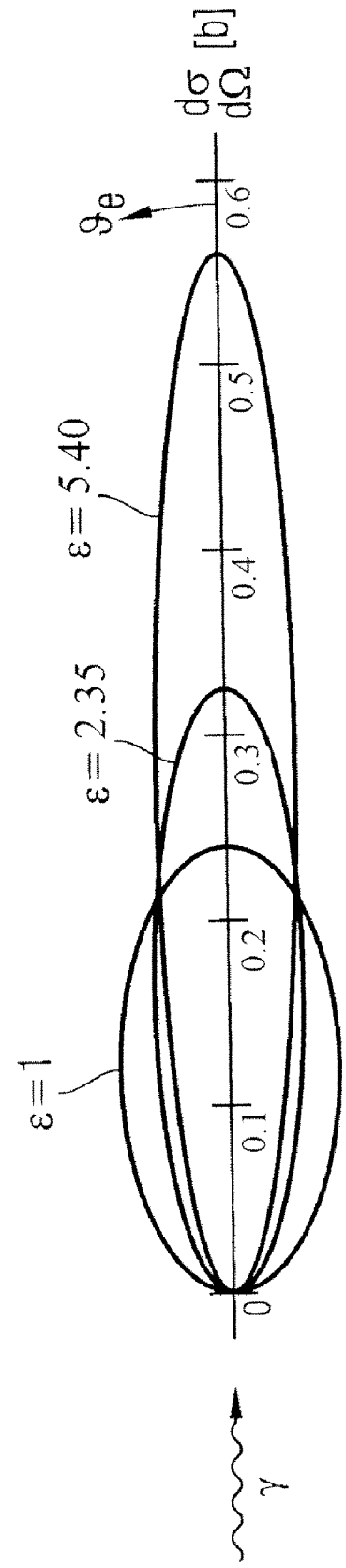
FIG. 3A shows a Klein-Nishina plot of the Compton scattering.

FIG. 3A shows the angular dependence of the scattering as a portion of a Klein-Nishina plot. The effective cross-section $d\sigma/d\Omega$ is plotted in barns against the scattering angle $\upsilon$ of the electron. As the gamma energy increases, the Compton electrons are scattered increasingly forwards. This also applies to pair production and to the photoelectric effect. In FIG. 3A, $\varepsilon$=1, $E_\gamma$=0.5 MeV and $\varepsilon$=5, $E_\gamma$=2.5 MeV. Even when $\varepsilon$=1, the electrons are already scattered very strongly in the forward direction.

The Compton electron loses its kinetic energy through collisions with further shell electrons in the detector material, and this leads to ionisation. Even with further collisions with secondary electrons, a primarily forward direction of scattering results at high energies owing to conservation of momentum. The electrons produced thus have a high probability of escaping in the forward direction of the original gamma quanta. This results in a "forward cascade" of the emitted electrons. The resulting secondary electrons further deposit their energy in the material and excite light emission in the scintillating detector material. This is registered for example by the photomultiplier 7. The corresponding electrical signals produced, which are introduced to the evaluation means 9, are proportional to the energy deposited in the scintillator material of the detector. The corresponding pulse-height spectrum then has a Compton edge and the photo peak.

Figure 3B:
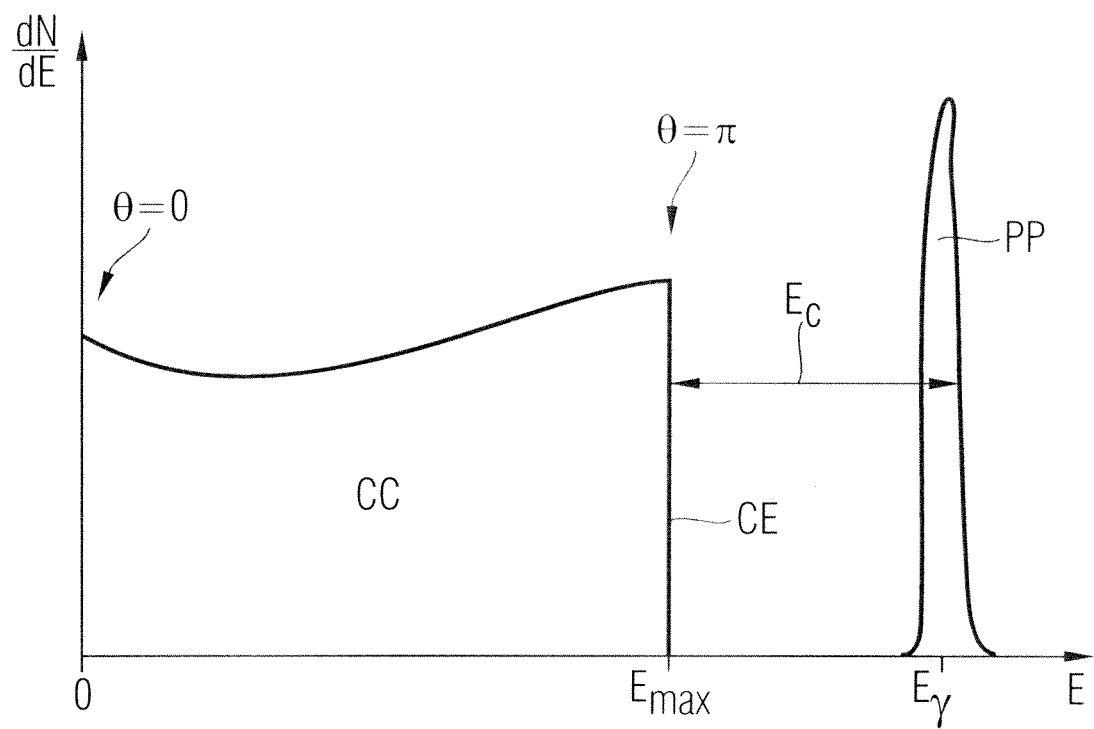
FIG. 3B shows a gamma intensity spectrum.

FIG. 3 shows by way of example a spectrum of the electrons for a scattering with gamma quanta of energy $E\gamma$. The Compton continuum CC is obtained up to the maximum transfer energy $E_{max}$, the lowest energy being achieved at a scattering angle of $\theta$=0°, and the maximum energy $E_{max}$, which forms the Compton edge CE, being achieved by the forward scattering where $\theta$=$\pi$. A photo peak PP is further shown and occurs at a distance of $E_c$=$E_\gamma$-$E_{max}$ from the Compton edge CE.

According to the invention, the energy deposition is not sensed in the whole of the detector volume between the front and rear face, but only in the particular regions or segments which comprise scintillator material. This means that a direction-dependent modulation of the energy deposition can be established by means of Compton electrons. According to the invention, an amount of light proportional to the energy deposited in the respective scintillating detector material is detected by the photodetector. It does not make any difference which side of the detector element the photomultiplier 7 is arranged on.

To simplify the explanation, only Compton electrons which have a maximum scattering angle, i.e. 180°, will be considered. In the context of a CSDA model, these Compton electrons release their energy along a path which extends in the direction of the respective incident gamma quantum. CSDA stands for continuous slowing down approximation. According to the angle and location of the incidence of the gamma quantum on the detector element, different energy depositions result in the scintillator material.

Figure 4:
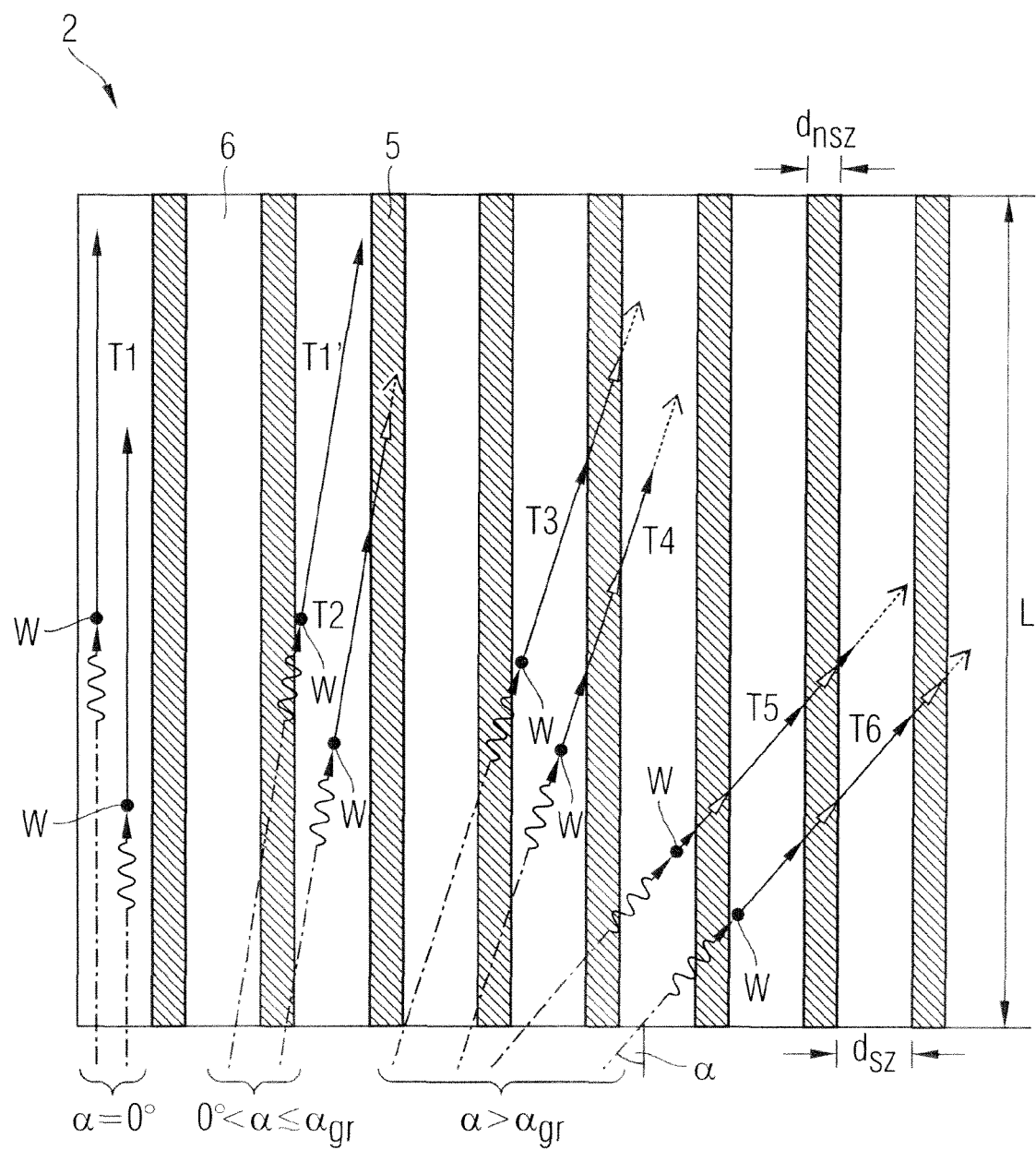
FIG. 4 shows the path of radiation trajectories through a detector element.
Figure 5:
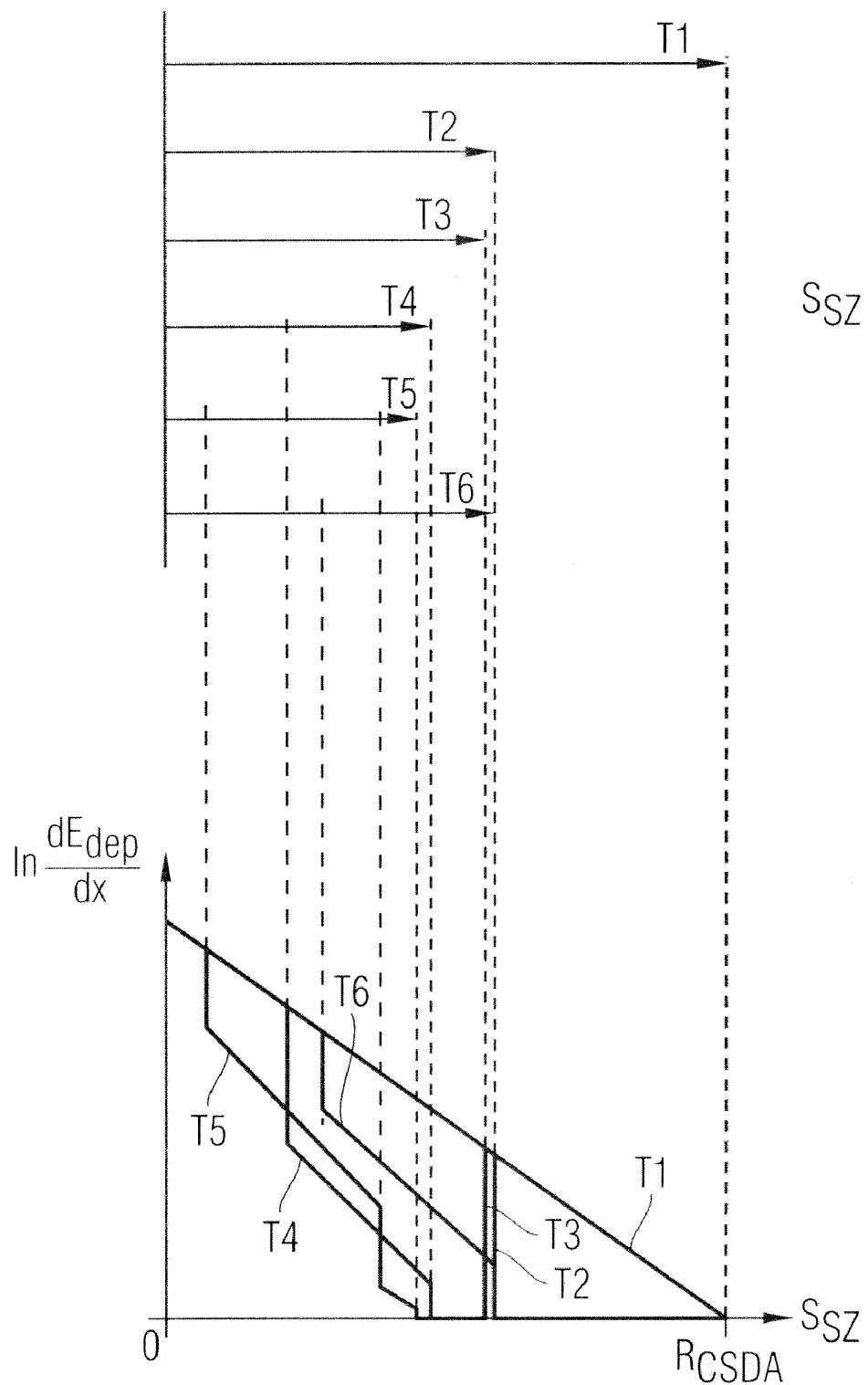
FIG. 5 shows distances travelled and energy depositions in the detector element.

FIG. 4 shows possible trajectories through a detector element 2 according to the invention and FIG. 5 shows the remaining path length $S_{SZ}$ of a respective trajectory in the scintillator material and the energy deposition of a respective gamma quantum.

In FIG. 4, the respective interaction points W, i.e. the location of a respective 180° Compton scattering, are shown by filled-in circles. The dot-dash lines and wavy lines indicate the approaching photon. The arrows with solid arrowheads represent an energy deposition of the Compton electrons in the scintillator material, and the arrows with a hollow arrowhead represent energy deposition in absorbers or non-scintillating material of the detector regions 5.

In the case of frontal incidence, i.e. parallel to the planes of the detector material layers, 5, 6, and when the gamma quantum enters a region 6 of scintillating detector material as shown by the trajectories T1, the whole of the energy is deposited in a segment or a layer of the detector element. The respective energy deposition $E_{dep}$ in regions with scintillating material is shown more precisely in FIG. 5.

FIG. 5 first shows the remaining path lengths $S_{SZ}$ in the scintillator material for the trajectories T1-T6 shown in FIG. 4. FIG. 5 further shows in a logarithmic representation the energy depositions $E_{dep}$ in the scintillator material as a function of the path length $S_{SZ}$.

If the length L of the detector regions is greater than $R_{CSDA}$, i.e. the range of the radiation in the respective material, the highest energy deposition in the scintillating material takes place for a frontal incidence on the detector element along the trajectory T1. The whole of the electron energy is then deposited in one of the detector regions with scintillating detector material. This applies to all energies of the Compton electrons.

In accordance with FIG. 5, energy is deposited in the scintillator material over the whole range of the trajectory T1, and this energy is measured for example by means of an attached photomultiplier 7.

As the angle of incidence $\alpha$ increases, the probability increases that Compton electrons of all energies will deposit part of their energy not in the scintillating material, but in one of the absorber layers 5. This reduces, for each electron energy spectrum, the probability of a complete energy deposition in the respective active detector layer.

For the trajectory T4, for example, an energy deposition initially takes place in the scintillator material, then in the absorber material or non-scintillator material and once more in the scintillator material. The remaining path length in the scintillator is therefore considerably smaller by comparison with the trajectory T1.

The graph of the energy deposition in the scintillator material also clearly shows steps, which are brought about by the energy deposition in the absorber material. The lower the thickness $d_{SZ}$ and $d_{nsz}$ of the regions with the scintillator material or absorber material, the greater the probability of an incomplete energy deposition in a corresponding scintillator material segment.

If the range $R_{CSDA}$ of the Compton electrons in the scintillating material is greater than the width $d_{SZ}$ of the region, this results in a critical angle $\alpha_{gr}$ from which the maximum energy $E_{max}$ will no longer be deposited in a single scintillator segment:

$$E_{dep}(\alpha \geq \alpha_{gr}) < E_{dep,max}. \quad \text{(Equation 2)}$$

If the widths $d_{SZ}$, $d_{nsz}$ of the scintillating and non-scintillating regions are smaller than the respective range, the probability that the energy will be deposited in a plurality of scintillator segments increases as the angle of incidence $\alpha$ increases. An energy deposition in k=2, 3, 4 ... scintillator regions requires that at least a distance $S_{NSZ} \geq k \cdot d_{NSZ}/\sin\alpha$ has been covered previously in non-scintillating material. The respective deposited energy of an electron thus decreases with the number of scintillator segments or regions passed through by the secondary electrons. Further critical angles, from which an energy deposition in k=2, 3, 4 etc. scintillator segments occurs, may therefore be determined.

If not only the gamma quanta of the Compton edge, but also the direction emissions of the whole spectrum of Compton electrons are considered, then a strong forward scattering of all Compton electrons produced, as shown in FIG. 3A, is found even at moderate gamma energies owing to the law of conservation of momentum. This means that with complete or accurate alignment of the detector element towards the radiation source, even the low energy electrons can deposit their energy completely in the target material or scintillator material. If the detector element is now rotated by an angle relative to the radiation source, then many low-energy electrons pass into the absorber material and lose energy there without contributing to the detector signal. Overall, this means that in the detector spectrum, high-energy signals are lost and the whole spectrum is shifted towards lower energies.

Because the secondary electrons thus pass diagonally through the layers or plates of the first and second regions, this results in a maximum path length per layer of, for example, $S_{SZ} = d_{SZ}/\sin\alpha$. Because the electrons may be produced at any point in the plates, this means that the path for the energy release of the electrons is limited and the electrons may release only part of their energy in the respective detector material. The remaining energy is released in the adjacent absorber material. Thus, the whole spectrum of the deposited energy is shifted towards lower energies.

Recording energy spectra of this type at different angles of incidence with a movable detector or with a plurality of detectors which are arranged at different angles relative to one another produces spectra with the greatest high-energy proportions when the preferred direction or the front face of the detector element is directed frontally towards the gamma source.

The alignment of the incident radiation relative to the preferred direction of the detector element used may take place by recording spectra of the energy deposited in the detector by the secondary electrons. For this purpose, spectra are recorded and analysed for various angles of rotation β of the detector element. In the process, the spectrum recorded at a respective angle of rotation is divided into a plurality of energy ranges and the respective energy deposited therein is measured. These energies may, as is described below, be considered as integrals over the intensity, or individual channel numbers of the corresponding intensity histogram may also be used. Because, with a frontal incidence of the gamma quanta on the detector element, even the scattered secondary electrons move in the gamma direction and deposit energy in only one of the detector layers, the high-energy proportion in the spectrum is then greatest. In the simplest case, two energy ranges, a higher and a lower, for example in the vicinity of the Compton edge, are sufficient for estimating the high-energy proportion.

The detector element is thus rotated by an angle of rotation in such a way that the high-energy proportion is at a maximum, and the low-energy proportion in the associated spectrum is at a minimum by comparison with the usual angle of rotation. The preferred direction, or the front face in the case of a detector constructed in a layered manner as shown in FIG. 1, 2 or 4, then points in the direction of the radiation source.

In order to determine the direction of the radiation incident on a detector element according to the invention, in an alternative possible method for the detector according to the invention, a suitable direction parameter r is determined and depends on the ratio of two integrals in the recorded spectrum:

$$r = I_1/I_2 \quad \text{(Equation 3)}$$

Figure 6:
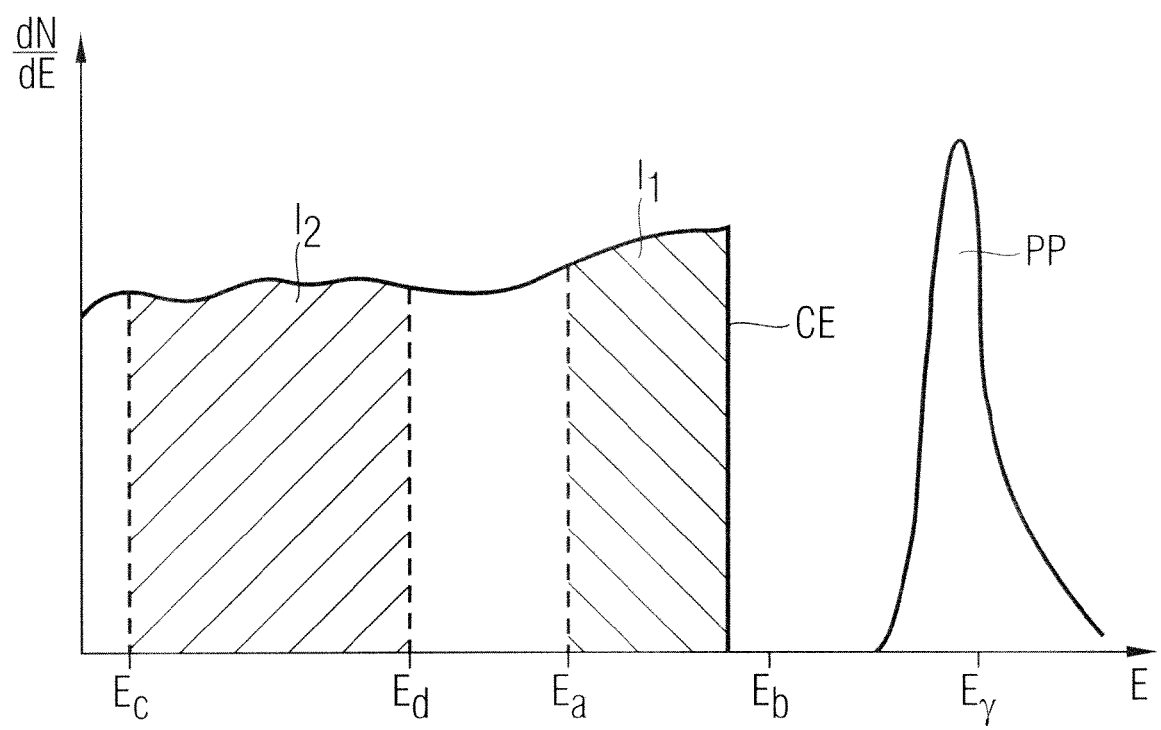
FIG. 6 shows a division according to the invention of a recorded intensity spectrum.

Here, $I_1$ represents an integral for example in the vicinity of the Compton edge and $I_2$ represents an integral over a low-energy range in the Compton continuum at a sufficient distance from the Compton edge CC. The integral $I_1$ in this case therefore covers a low-energy range, and the integral $I_2$ covers a high-energy range. FIG. 6 illustrates possible integration limits for the integrals $$I_1 = \int_{E_a}^{E_b} \frac{dN(E)}{dE} dE \text{ and } I_2 = \int_{E_c}^{E_d} \frac{dN(E)}{dE} dE. \quad \text{(Equation 4)}$$

in which the integration limits $E_a$ and $E_b$ cover an energy range in which the Compton edge is expected to lie, and $E_c$ and $E_d$, as noted previously, delimit a range in the Compton continuum.

The selection of the integration limits $E_a$, $E_b$, $E_c$, $E_d$ in this case preferably depends on the energy resolution $R(E) = \Delta E/E$ of the detector. $\Delta E$ in this case corresponds to the half-width of a photo peak formed by monoenergetic photons. The following applies for the distance of the intervals, i.e. the distance between $E_a$ and $E_d$, with an energy-dependent resolution $R(E) = \Delta E/E$:

$$E_a - E_d > R(E_a) \cdot E_a \text{ and } E_a - E_d > R(E_d) \cdot E_d. \quad \text{(Equation 5)}$$

The respective angle of incidence may be determined from the direction parameter r. For a frontal incidence or at a low angle of incidence α of the radiation to be detected, the integral $I_1$ is predominant, whilst the direction parameter r decreases as the angle of incidence α increases. By turning or rotating the detector element, a maximum value for the direction parameter r may therefore be achieved, and the direction of the corresponding radiation source relative to the preferred plane of the detector element may thus be determined. In a layered arrangement of scintillating and non-scintillating material, as is shown by way of example in FIGS. 1, 2 and 4, a preferred plane parallel to the layers is obtained.

With a combination of two detector elements according to the invention made of layers, the preferred planes of the detector elements being mounted perpendicular to one another, directional resolution may be achieved by means of the intersecting preferred planes of the two detector elements. FIG. 7 shows examples of possible alternative arrangements of regions with scintillating detector material and non-scintillating detector material. The shaded regions in this figure indicate regions with scintillator material or active detector material.

Figure 7A:
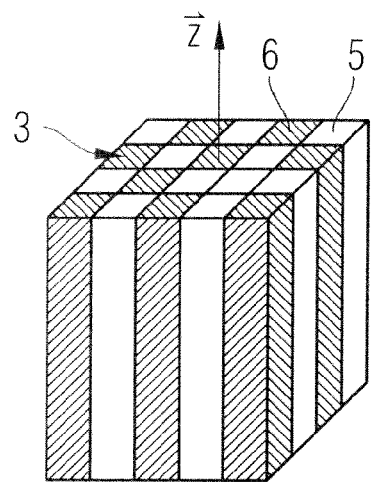
FIG. 7 shows various geometric embodiments of the detector element.
Figure 7B:
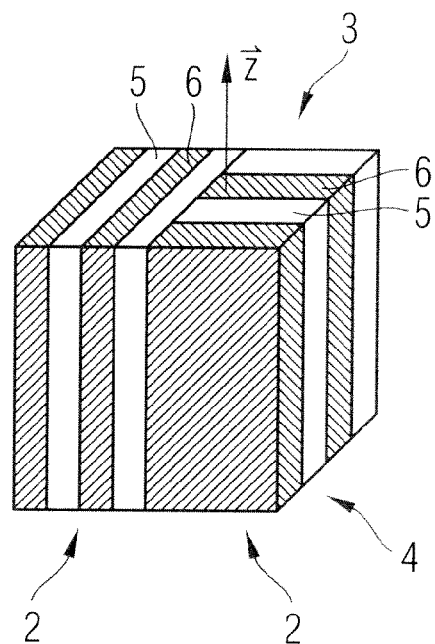
Figure 7C:
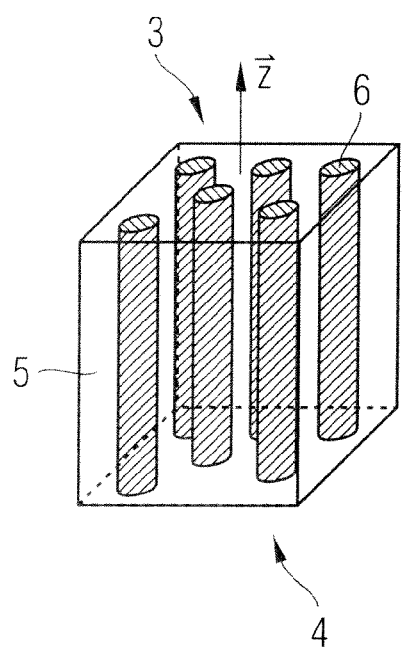
Figure 7D:
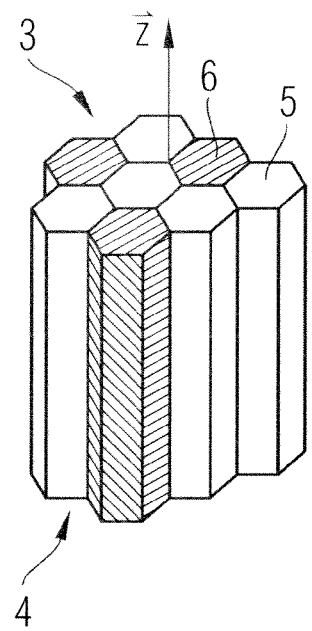
Figure 7E:
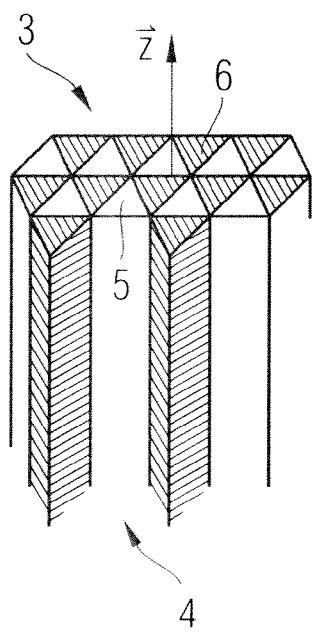

By way of example, FIG. 7b shows two detector elements 2, which are oriented perpendicular to one another. Naturally, it is also possible to construct the regions of scintillating and non-scintillating detector material as polyhedra. By way of example, FIG. 7a shows a block of polyhedra with substantially square bases, segments of absorber material or non-scintillating material 5 and scintillating material 6 being arranged in a chequered manner. FIGS. 7d and 7e show detector elements which are likewise constructed from polyhedra, with a hexagonal base in FIG. 7d and with a triangular base in FIG. 7e. The arrangement of cylindrical regions of scintillating material, of which the axes of symmetry are arranged so as to be parallel, and which are surrounded by a non-scintillating material, as is shown in FIG. 7c, is also conceivable. In FIG. 7, the preferred direction is shown in each case by $\vec{Z}$ a vector.

As an alternative to regions with scintillating material and absorber or non-scintillating material, semiconductor materials, which work as semiconductor detectors, may also be used for the scintillating materials. Signals which specify the respective deposited energy may then be read directly from these respective active regions.

In a correspondingly altered configuration of the detector assembly according to the invention, the first and second regions comprise active detector material, the two regions each being able to be read separately. The material of the first regions then acts as an absorber for the material of the second regions and vice versa. This case may also be thought of as two interleaved detector elements, the active layers (regions with active detector material) of the two detector elements being slid into one another and engaging with one another like teeth. The layer thicknesses in this case may be equal or different for the two materials. Chemically similar or different material compositions are also possible.

Figure 8:
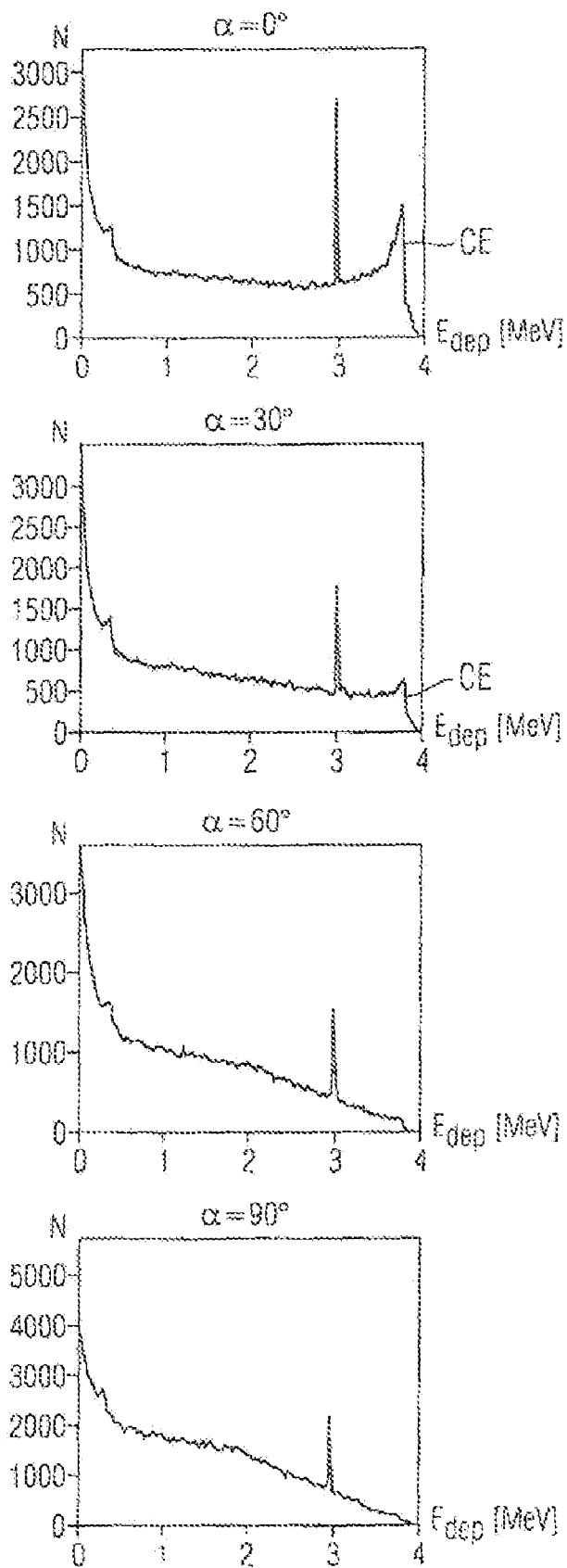
FIGS. 8 and 9 show simulations of recorded spectra from a detector assembly according to the invention.
Figure 9:
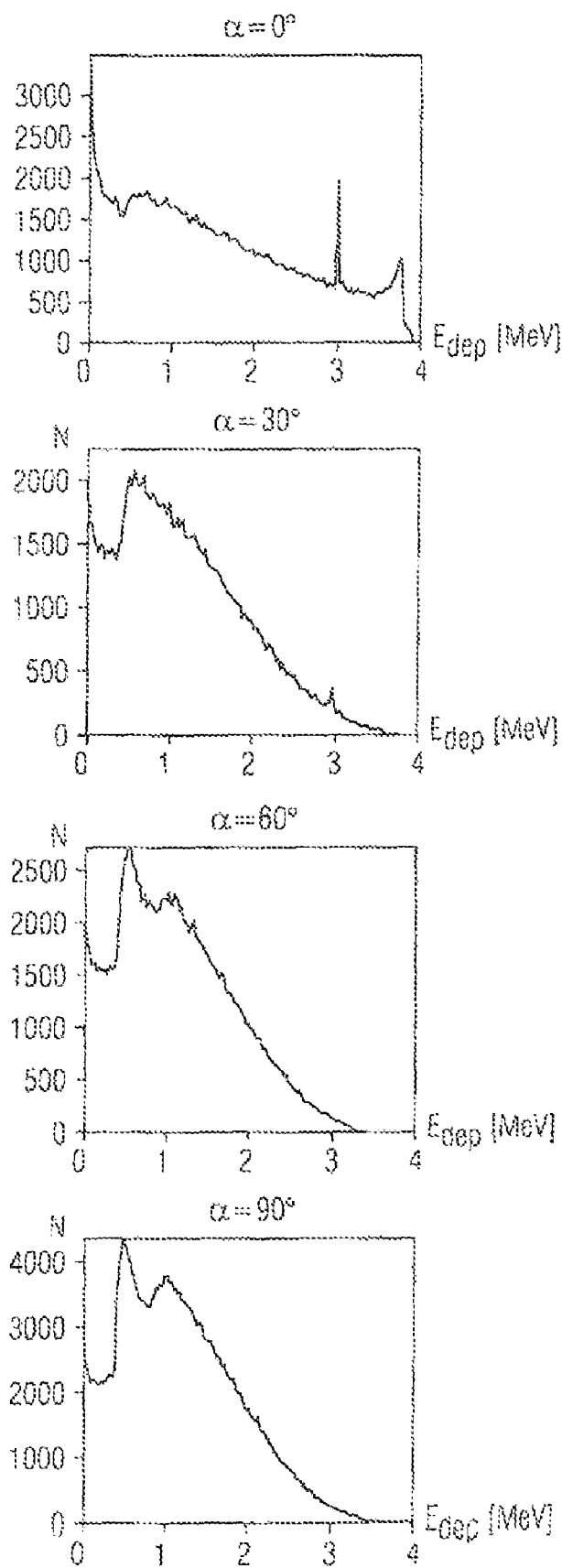

FIGS. 8 and 9 show simulation results by the applicant for a detector element constructed in layers according to the invention, for different layer thicknesses $d_{SZ}$, $d_{nSZ}$ and angles of incidence α of the gamma radiation. In this case, monoenergetic photon beams with a photon energy of 4 MeV are assumed. The simulated detector element substantially corresponds to the embodiment shown in FIG. 1, a stack of square plates of dimension 44×44 mm² of an organic scintillator polyvinyltoluene being assumed in each case for the regions comprising scintillator material, and iron being taken as the absorber material.

FIG. 8 thus shows spectra of energy deposited in the respective scintillator material for six plate pairs with thickness $d_{SZ}$=9.5 mm for the segments of scintillating material and a thickness of $d_{FE}$=1.6 mm for the iron plates. FIG. 9 shows spectra for a detector element assembled from 24 plate pairs, in which $d_{SZ}$=2.4 mm and $d_{FE}$=0.4 mm. A detector element according to the invention therefore only has a low volume of approximately 67×44×44 mm³ and thus is easy to operate and has numerous applications.

A thickness of $\rho_{SZ}$=1.032 g/cm³ and a stoichiometric composition of $C_{10}H_{11}$ are assumed for the scintillator material polyvinyltoluene. A thickness of $\rho_{FE}$=7.874 g/cm³ is assumed for the iron. The energy resolution of the detector element is taken as R=0. FIGS. 8 and 9 show histograms or distributions of events in the detector element, evidencing a total of $10^6$ photons. The respective cross-section of the detector element was irradiated evenly in this case.

In the configuration of FIG. 8, i.e. with six plate pairs, a Compton edge CE can be recognised clearly at angles of incidence of α=0° and α=30°. As the angle of incidence α increases, the proportion of high energy events in the spectrum decreases. A greater directional dependency of the shape of the recorded spectrum can be seen in FIG. 9 in the configuration with 24 plate pairs. With 24 plate pairs, and therefore also a relatively low plate thickness, the critical angle $α_{gr}$ at which the spectral form substantially changes is lower than in the configuration according to FIG. 8. The peaks occurring at approximately 3 MeV correspond to double escape peaks of pair production and occur 1.022 MeV below the gamma energy.

Alongside the detection of gamma radiation using directional resolution, the invention further allows the recognition of particular elements in a material sample which is to be analysed. A particular field of application in this case is the detection of explosives, for example for clearing mines.

A further embodiment of the direction-resolving detector assembly therefore provides a neutron source for the bombardment of a material sample, such as a particular region of the ground, with neutrons. The bombarded material is thus activated and emits characteristic gamma radiation.

FIG. 10 shows a corresponding detector assembly 200 according to the invention. A neutron source is provided and emits preferably aligned neutrons n, with which a material sample 12 is irradiated. When the neutrons are captured, a nuclear reaction takes place in the respective material sample in such a way that in conjunction with this, gamma quanta are emitted and are detected by a detector element 2 according to the invention which is arranged so as to be rotatable. As was explained previously, a photomultiplier 7, which integrally measures the energy deposited in the active detector regions and feeds these to an evaluation means 9, is provided for this purpose. By rotating and determining the direction parameter r, the position of the gamma source, i.e. the material sample 12, may be determined with angular resolution.

The material of the earth's surface substantially comprises light elements H, C, N, O, Mg, Si, Al. $SiO_2$, silica sand and aluminium magnesium silicate occur particularly frequently. As neutron energy increases, the neutron-capture cross-section of these elements decreases. Neutrons below 4 MeV are captured particularly frequently. For example, the capture cross-sections for thermal neutrons are 3.3 mb for carbon, <0.2 mb for oxygen, 80 mb for nitrogen, 63 mb for magnesium, 130 mb for silicon, and 230 mb for aluminium. In particular in the elements nitrogen, magnesium, silicon and aluminium, the capture of a neutron leads to energy gain of between 4.5 and 10 MeV. These excited states return to the ground state via a cascade via one or more intermediate states with emission of gamma radiation. Only nitrogen has a direct transition, with angular momentum j=3/2 to j=½, from 10 MeV with 10% probability. Usually, three to five predominant lines are obtained in the corresponding gamma spectrum, at energies between 2.5 and 7.5 MeV.

Figure 11A:
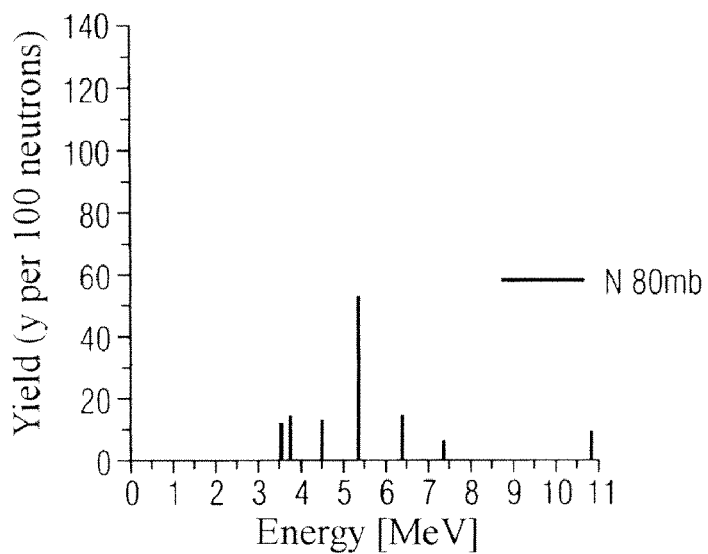
FIG. 11 shows gamma lines produced by neutron activation.
Figure 11B:
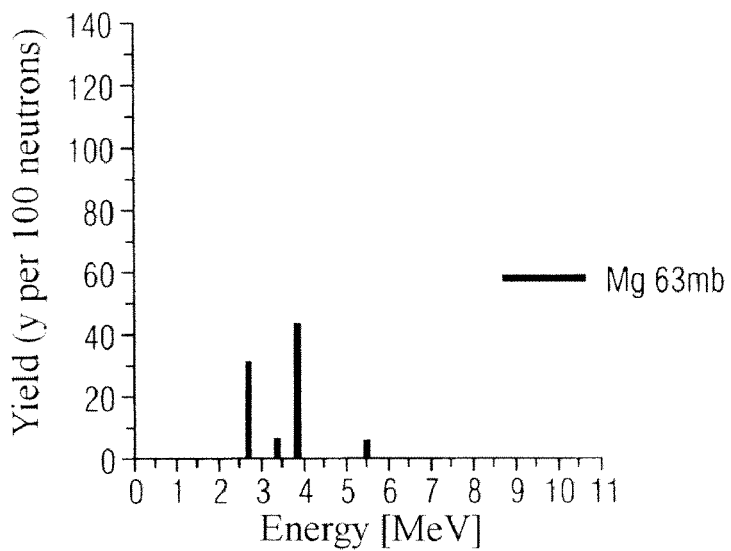
Figure 11C:
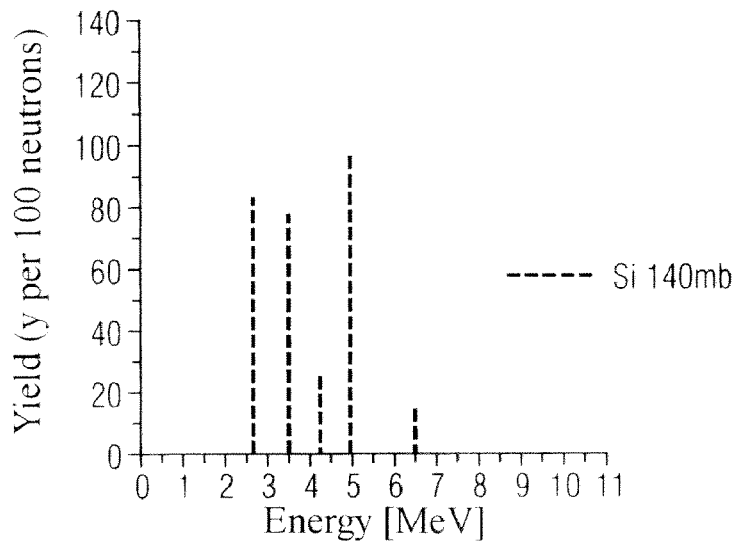
Figure 11D:
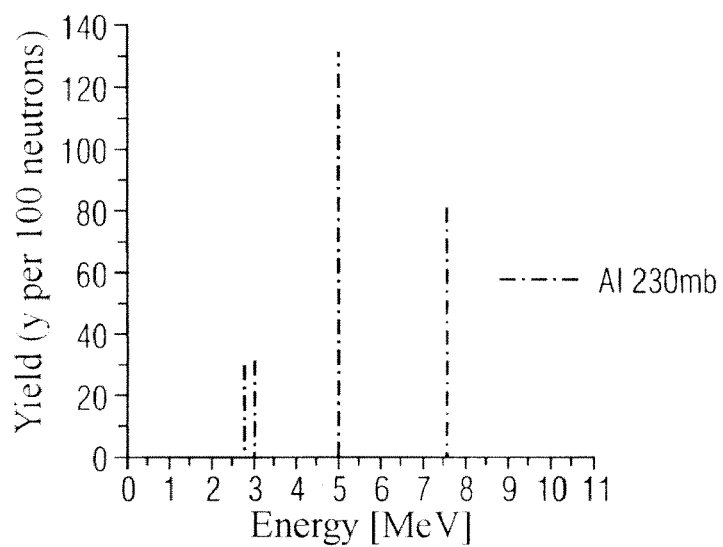
Figure 11E:
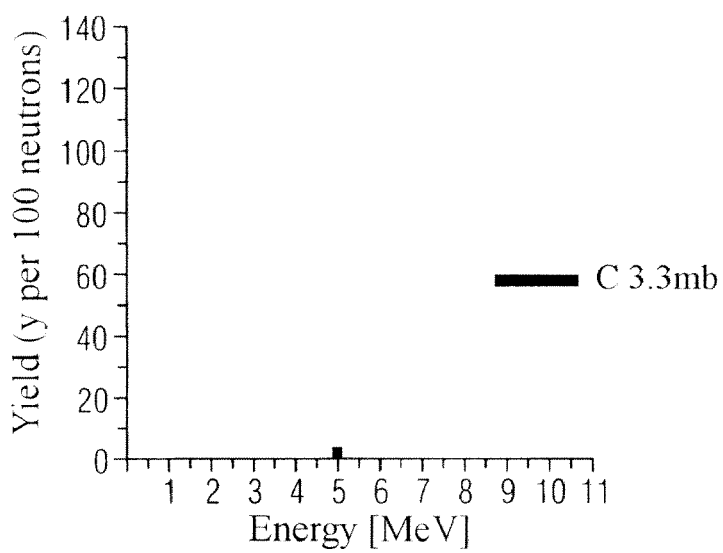
Figure 11F:
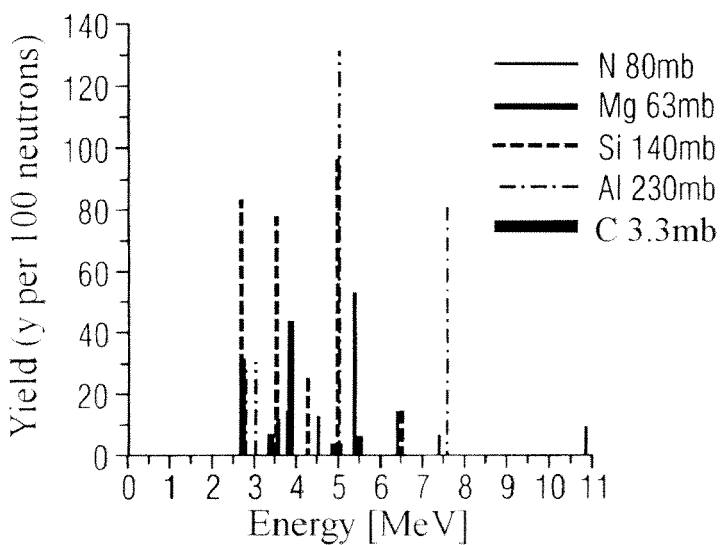

FIG. 11 shows typical yields of gamma radiation after neutron reactions or a neutron activation of nitrogen, magnesium, silicon, aluminium and carbon (FIG. 11a to e) and yields which result in a corresponding element or material sample mixture (FIG. 11f). In this case, the yield gives the number of gamma quanta per 100 neutrons captured. In particular, nitrogen, which is important for the recognition of explosives, has four significant lines between 5 and 6.5 MeV and the 10% excitation at 10.8 MeV.

High resolution spectroscopy is usually tried in order to resolve individual lines in the resulting gamma spectra and thus verify the presence of nitrogen deposits. However, the high energy resolution of a corresponding detector is associated with an extremely low probability of a response and an extremely high apparatus expense in order to be able to distinguish between lines of different elements. These lie very close to one another, as is shown in FIG. 11f.

According to the invention, no extremely high resolution gamma spectroscopy takes place, but spectra as shown in FIG. 9 are recorded in order initially to resolve the direction of the radiation incident on the respective detector element. The respective gamma lines produce wide Compton distributions in the detector element according to the invention, which distributions extend, as may be seen from FIGS. 8 and 9, from the Compton edge to low energies. To detect a material being searched for, for example nitrogen, in the material sample activated with neutrons, it is now provided in accordance with the invention for the recorded spectrum to be divided into at least three parts and for the integral intensity to be determined in each case over these three ranges, a colour parameter being assigned to each intensity.

Figure 12:
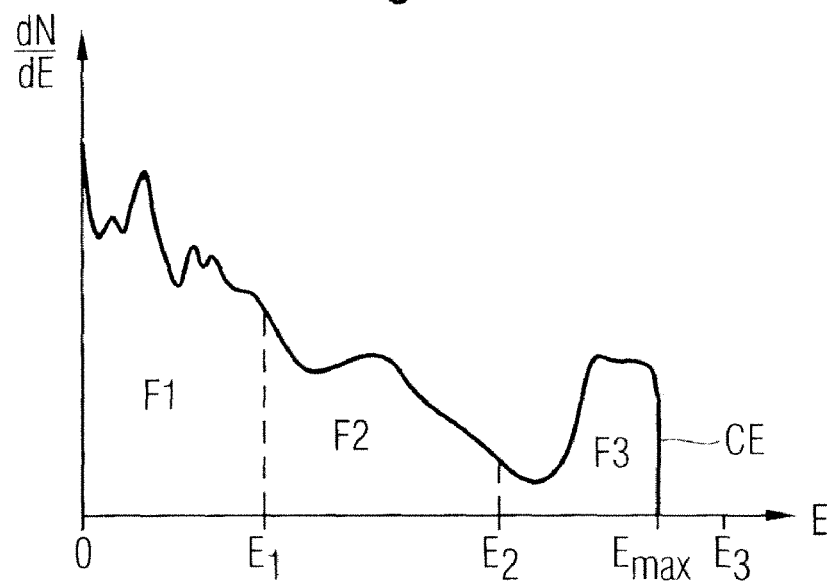
FIG. 12 shows a division according to the invention of an intensity spectrum for material analysis.

According to the invention, a recognition method similar to colour vision is used to detect particular elements in the material sample. FIG. 12 shows by way of example a recorded intensity spectrum or a recorded distribution of the energies deposited in the active detector material, i.e. in the scintillator material. In this case, CE indicates the Compton edge for a maximum energy transfer $E_{max}$. The deposited energy is initially detected in a first energy range, for example between 0 and $E_1$.

The integral over the intensity dN/dE between 0 and $E_1$ is also calculated, and a first colour parameter F1 is thus determined. The deposited energy in a second energy range between $E_1$ and $E_2$ is determined in that the integral between $E_1$ and $E_2$ is calculated in order to determine a second colour parameter F2. Lastly, in accordance with the invention, an integration is performed between $E_2$ and $E_3$ in order to calculate the corresponding integral and to derive the colour parameter F3. For example, the energy ranges could lie between 1 and 3 MeV, between 3 and 5 MeV, and above 5 MeV.

A characteristic spectrum, and therefore also a characteristic combination of colour parameters F1, F2 and F3 is obtained for each of the elements shown in FIG. 11 by way of example. Analogously to colour vision, an overall colour signal with a colour impression is obtained from three energy or frequency ranges, which substantially correspond to the three primary colours red, green and blue in human colour vision. In accordance with the invention, a colour impression is now determined from the measured spectrum via the combination (F1, F2, F3).

In a three-dimensional colour space of this type, which is spanned by the coordinates F1, F2 and F3, it is in principle possible to assign a vector, or at least a volume, in the colour space to each element to be detected. If a measured or calculated combination of colour parameters (F1, F2, F3) for a spectrum of an unknown material sample now leads to a vector (F1, F2, F3) which appears in a volume of this type, then an element which is being searched for is recognised. Thus, despite the rather low energy resolution of the detector according to the invention, a colour analysis of the spectrum may take place at a sufficiently high count rate and the material of the material sample, which is for example activated with neutrons, may thus be recognised.

The invention therefore allows "colour information", which is used for an elemental analysis of the material being analysed, to be determined in addition to the directional information. The layered embodiment of the detector element according to the invention results in a colour shift, leading to smaller signals in the case of non-frontal gamma irradiation. This is particularly advantageous in the case of nitrogen detection. Because the high energy proportions are predominant for nitrogen lines, the nitrogen signal in the measured spectrum stands out particularly clearly from the remaining elements when the preferred direction of the detector is pointing towards the object being searched for or the material sample.

Figure 13:
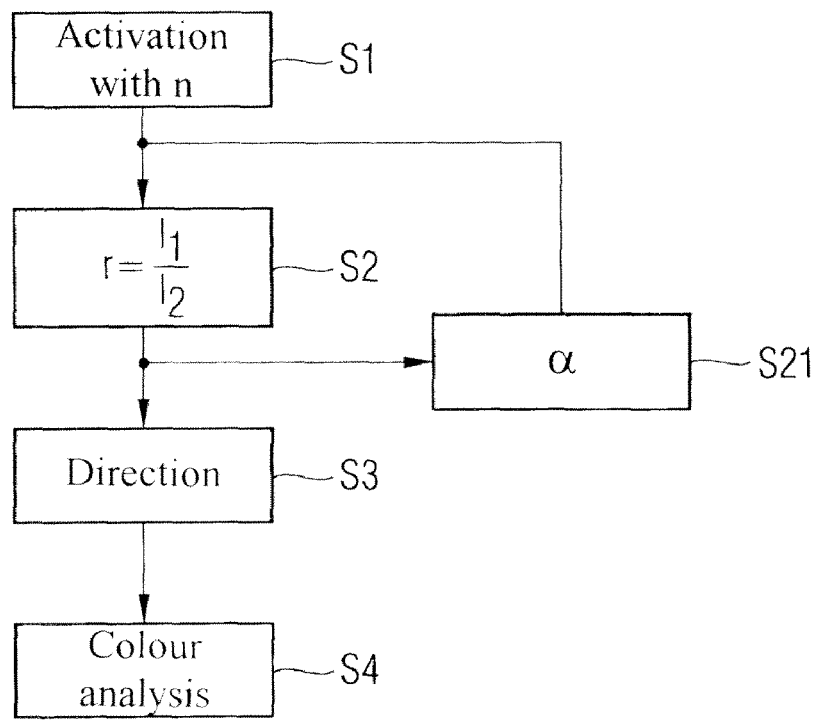
FIG. 13 shows a sequence of method steps according to the invention.

Using the method according to the invention and the detector assembly for the detection of landmines involves the following method steps, shown in FIG. 13. In a first step S1, the material to be analysed, for example a region of ground, is irradiated with neutrons by means of a neutron source, and this leads to nuclear reactions in the material. At a set angle of the preferred direction of the detector element relative to the ground region to be analysed, the energy deposited in the scintillator material is recorded and a direction parameter is determined in step S2 in accordance with equations 4 and 6. This is achieved by rotating the detector element at a plurality of altered angles of incidence α or angles of rotation (step S21). A maximum of the direction parameter r generally indicates that the preferred axis or direction of the detector element is pointing towards the radiation source. A direction is initially recognised in this way (step S3). Alternatively, in steps S2 and S21, the respective high and low energy portions of the spectra are detected at various angles of rotation. A preferred angle of rotation, at which the high energy portion of the associated spectrum exhibits a maximum based on the spectra recorded at the other angles of rotation, provides the direction of the radiation source in relation to the detector element.

Subsequently, a colour analysis is performed in step S4, i.e. at least three energy ranges are selected, and the deposited energy present therein in the scintillator material of the detector element is calculated as colour parameters F1, F2, F3. From these three obtained colour parameters F1, F2, F3, the presence of nitrogen-containing materials, in particular explosives, may be recognised for example by comparison with known colour parameter combinations.

The same sequence of method steps is provided in the analysis of luggage or cargo.

Deuterium-tritium generators or radioactive systems are possible neutron sources. Neutron generators make use of a reaction of t (d, n) $^4$He, which substantially produces an isotropic distribution of neutrons of energy 14.4 MeV. However, voltages of 300 kV, which require a relatively large generator, are required for accelerating the deuterons.

Possibilities for compact neutron sources with relatively low source strength include neutron emitters such as $^{252}$Cf with a half-life of 2.6 years and a neutron energy of a few MeV. It is also possible to use americium-beryllium preparations, which are mixed in a powdered form in order to increase the yield of Am and Be. Preparations of this form also provide an even, isotropic distribution of the neutron flow. However, heavy absorbers are required for shielding when transporting a neutron source of this type.

For this reason, for transportable use when searching for mines, a neutron source which can be switched off may be used, the alpha source such as $^{241}$Am and the beryllium target remaining separated. In the case of an alpha source formed with a large surface as a foil, a beryllium target is present a short distance away. Alpha particles which hit the beryllium target produce a wide neutron spectrum around 2.5 MeV upon doing so, primarily in the forward direction. By increasing the distance between the alpha emitter and the beryllium target, or by introducing an absorber, it is possible to halt neutron production. This also allows safe transport without expensive neutron shielding.

Figure 14:
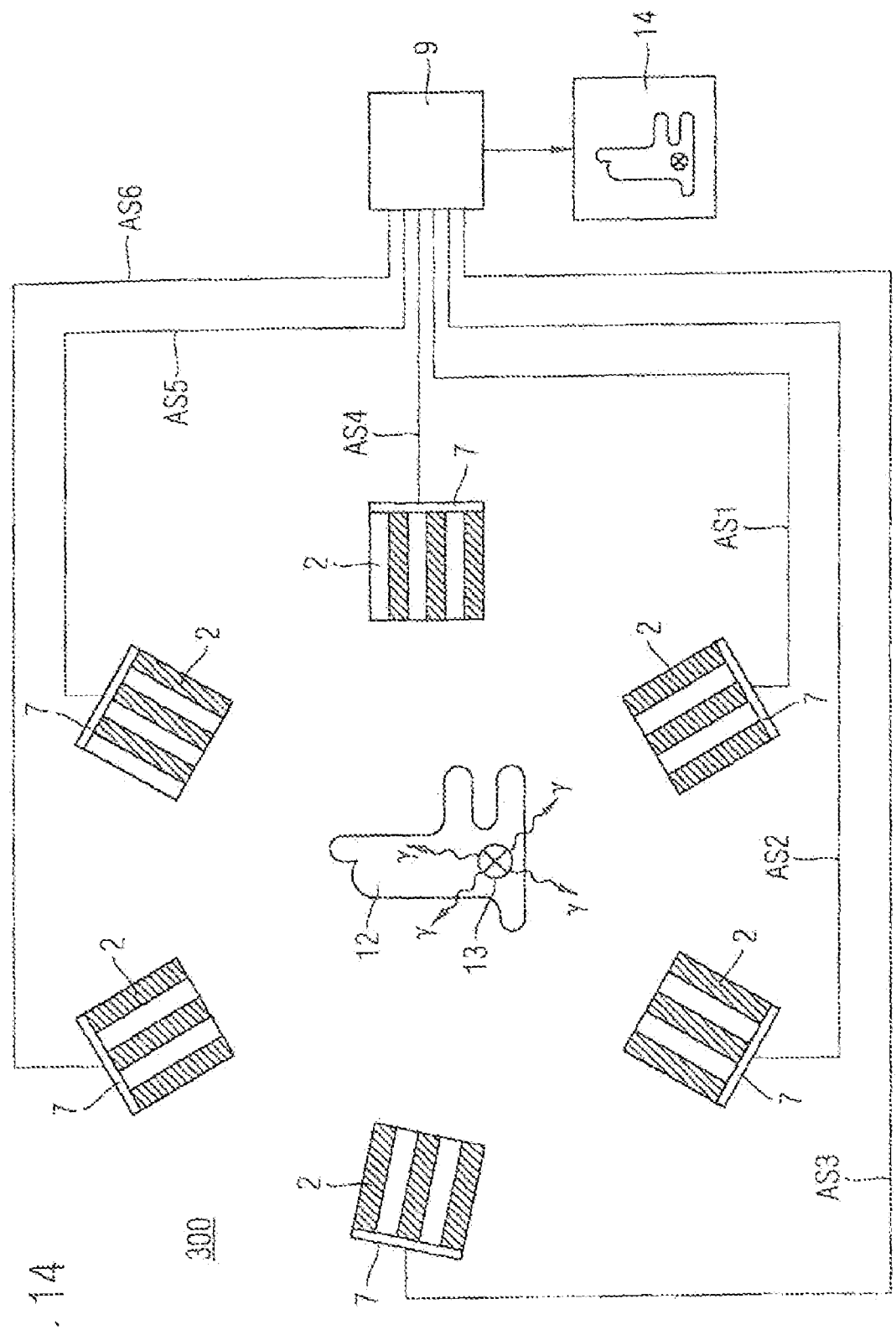
FIG. 14 shows a third embodiment of the detector assembly according to the invention.

A detector assembly according to the invention can also be used for tomographic applications. FIG. 14 shows a detector assembly 300 according to the invention, in which a plurality of detector elements 2 according to the invention are provided and are arranged about a material sample 12. The material sample 12 may for example be a piece of luggage or cargo which comprises a localised quantity of gamma-emitting material. The gamma-emitting material, as the gamma radiation source 13, may be produced for example by activating a capsule of explosives with neutrons.

The respective detector elements of the associated photomultiplier 7 each provide evaluation signals AS1-AS6 to an electronic evaluation means 9. From the various direction data which can be obtained in accordance with the method according to the invention, the position of the gamma radiation source 13 may be determined precisely. A display device 14 which is coupled to the evaluation means 9 may for example provide an image of the gamma source which is contained in the material sample 12.

When evaluating the direction data, which indicate at least one angle between the respective preferred direction of the detector element 2 and the radiation source 13, images may be produced and displayed with conventional imaging methods. The method according to the invention and the detector assembly may thus be put to excellent use in material analysis.

Figure 15:
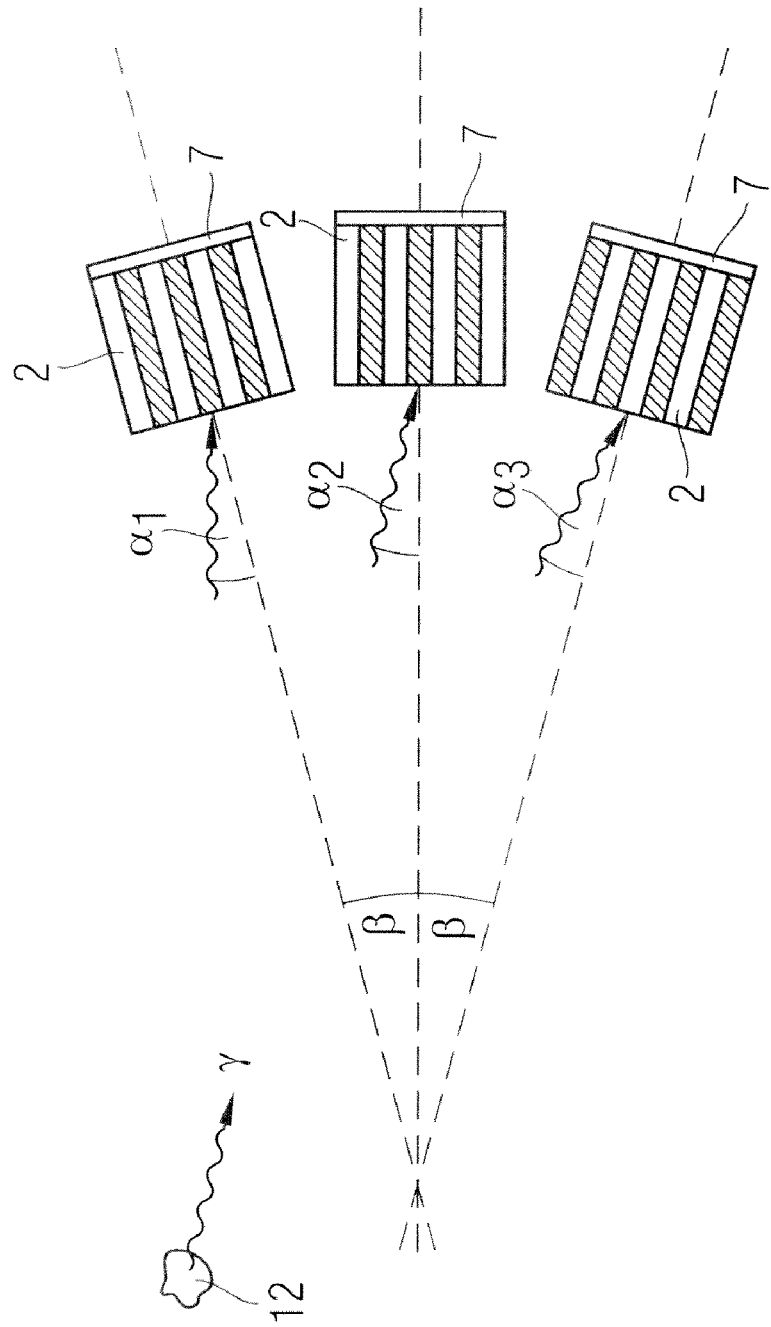
FIG. 15 shows a fourth embodiment of the detector assembly according to the invention.

FIG. 15 shows a fourth embodiment of the detector assembly, in which a plurality of detector elements 2 are arranged so as each to be turned through an angle β which is equivalent to an angle of rotation. Each detector element 2 records spectra of the Compton electrons in the active detector material via the respective photomultiplier 7. Based on a gamma source 12, a respective angle of incidence $\alpha_1$, $\alpha_2$, $\alpha_3$ is obtained for each detector element 2 relative to the preferred direction thereof, which is indicated by the dashed line. By comparing the energies deposited in the detector material which are recorded at different angles β in the predetermined energy ranges, the direction from which the maximum high energy intensity is coming may be determined. For example, the energies deposited in a first low energy range are measured in the three detector elements and compared with one another. A similar comparison of the deposited energies in a second, higher energy range then takes place. The gamma radiation source is then assumed to be in the preferred direction of the detector element for which the high energy portion in the recorded spectrum is shifted towards lower energies by the smallest amount.

The invention thus allows a direction-dependent detection of high energy photons, the collimation taking place in the respective detector material. By avoiding passive absorber layers, a higher efficiency is achieved than with external collimation by means of collimation holes. The construction of a collimator for the incident gamma quanta in front of the actual detector with active detector materials is thus not required. According to the invention, no collimator of any sort, which would decrease the transmission of the detector assembly, is provided for the detector element. A fixed collimator could also only be optimised for a particular energy range, whilst the construction according to the invention may be applied flexibly. Instead of a conventional collimation of the incident gamma quanta, the electrons produced in the detector materials, for example by and/or pair production, are collimated within the detector. The electrons produced by the incident photons may also therefore be decelerated more easily, i.e. over a shorter distance, in the respective detector material (solid body). Because no coincidence measurements are required, simpler signal processing is also possible. In combination with a neutron source for excitation, in particular of nitrogen-containing explosives, it is possible for example to detect land mines or to analyse luggage and cargo.

The determination according to the invention, in a manner similar to colour analysis, of an elemental composition of the material sample is also possible in a simple manner.

The detector elements may be produced using simple, standardised components. The small embodiment, in particular of the detector elements without external collimation means, allows for use as a portable means and allows the detection space to be equipped with detector elements according to the invention in imaging applications.

Figure 16:
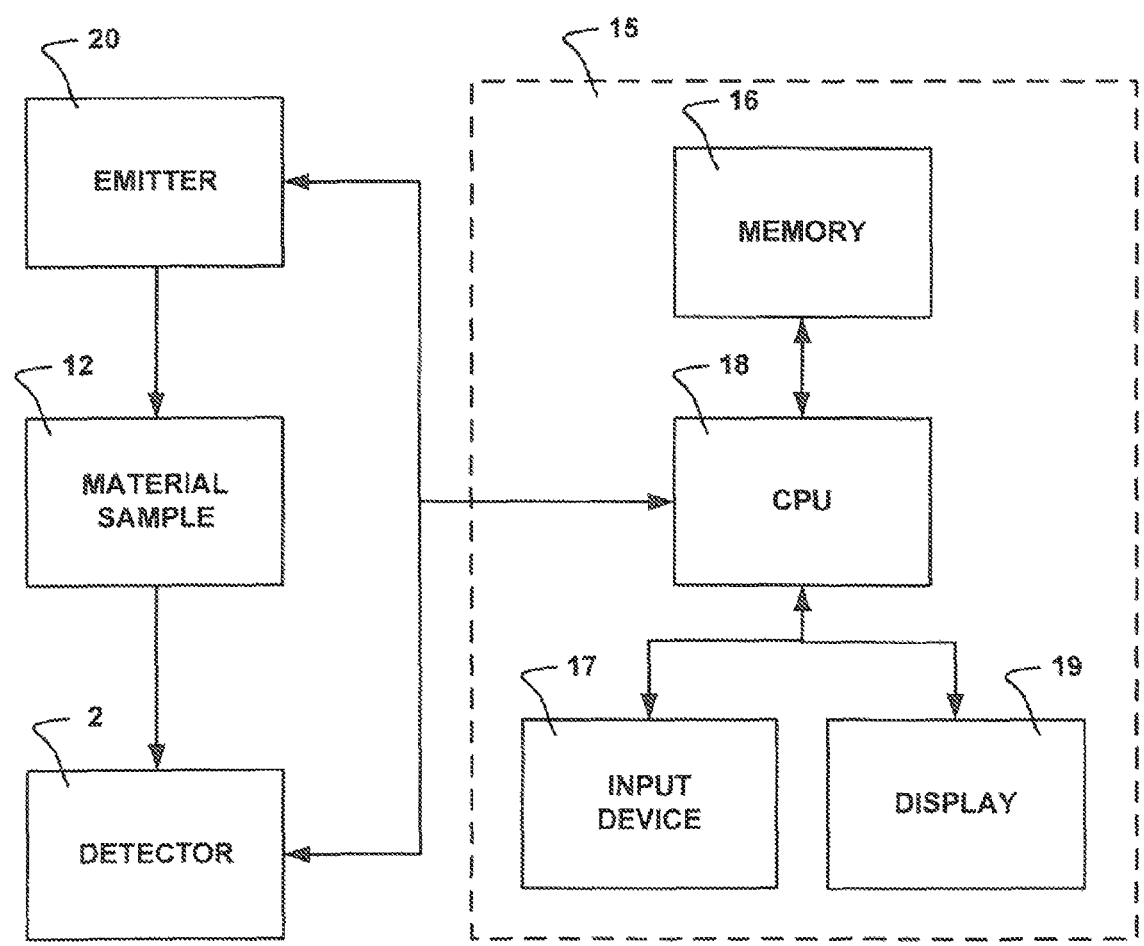
FIG. 16 shows a schematic block diagram of an exemplary apparatus that is capable of implementing one or more aspects of the present invention disclosed herein.

FIG. 16 shows a schematic block diagram of an exemplary apparatus that is capable of implementing one or more aspects of the present invention. A processing device 15, such as a personal computer (PC), may be used to perform the steps of determining the material composition of a sample. The processing device 15 may include memory 16, input devices 17, a central processing unit 18 and a display 19. The memory 16 may be any of a variety of storage devises such as Random Access Memory (RAM) and/or Read-only Memory (ROM). The input devices 17 may include a keyboard, mouse, or joystick with which a user may use to input commands to the CPU 18. The CPU 18 may be configured to read and write data to the memory 16, accept input commands from the input devices 17, and display the results on display 19. The CPU 18 may also interface with an emitter 20, and a detector 2 providing input steps, performing calculations, and/or formatting data on irradiated material sample 12 according to the steps previously described. The emitter 20 may be any radiation emitting device such as, for example, the previously described neutron source 11.

Although the present invention is explained in detail by way of preferred embodiments, it is not limited to these but may be modified in numerous ways. In particular, the layer arrangements described in detail may be changed. The penetration of a plurality of detector materials in the case of trajectories of incident gamma radiation with different angles relative to the preferred direction of the detector elements is essential. This preferred direction is obtained by the respective geometry of the different detector regions of active detector material and absorbing detector material. Modifications besides the geometries shown in FIGS. 1 and 7 are of course possible in this case. Also, other devices than the light measurement means or the photomultiplier, given by way of example, are conceivable for reading the active detector materials.

The energy ranges specified in the description may also be changed without fundamentally altering the trajectories and energy depositions of the Compton electrons. Naturally, the invention may be used in numerous ways besides the examples mentioned for mine detection and luggage control or tomographic applications.

LIST OF REFERENCE NUMERALS 1 detector assembly
2 detector element 3 front face
4 rear face
5 first region
6 second region
7 photomultiplier
8 photocathode
9 evaluation means
10 display means
11 neutron source
12 material sample
13 gamma radiation source
14 display means
15 processing device
16 memory
17 input device
18 central processing unit
19 display
20 emitter
AS1-AS6 evaluation signals
γ gamma radiation
S1-S4, S21 method steps
CE Compton edge
F1, F2, F3 colour parameters
α angle of incidence
$\vec{Z}$ direction vector
PP photo peak
$S_{SZ}$ path length in the scintillator
$S_{NZ}$ path length in the absorber
T1-T6 trajectory
$R_{CSDA}$ range according to continuous slowing down approximation
$d_{NSZ}$, $d_{SZ}$ thickness
$α_{gr}$ critical angle

We claim:

1. A method for detecting radiation with angular resolution comprising:
    providing a detector assembly, said detector assembly comprising at least one detector element having a front face and a rear face, wherein a space between the front face and the rear face of the detector element is filled with a plurality of regions of a first detector material and at least one region of a second detector material, and each region connects the front face to the rear face of the detector element, and wherein an energy deposition takes place in at least the regions of the first detector material as a function of an angle of incidence of the radiation on the detector element;
    recording a spectrum of the energy deposited in the first detector material in a first energy range;
    recording a spectrum of the total energy deposited in the first detector material;
    determining a first energy deposited in a first energy range;
    determining a second energy deposited in a second energy range; and
    comparing the first deposited energy with the second deposited energy.

2. The method according to claim 1, wherein a Compton edge lies in the first energy range in the recorded spectrum.

3. The method according to claim 1, further comprising irradiating the material sample with neutrons to activate the material sample.

4. The method according to claim 1, further comprising:
    determining a preferred angle of rotation, for which the energy deposited in the first or second energy range is a maximum or a minimum; and
    determining a direction of a radiation source in the material sample relative to the detector element as a function of the preferred angle of rotation.

5. The method according to claim 1, further comprising:
    determining a direction parameter as a function of the ratio of the first and second deposited energies for a plurality of detection directions, said detection direction being substantially normal to the front face of the detector element;
    determining a direction of a radiation source in the material sample relative to the detector element as a function of the direction parameter.

6. A method for detecting radiation with angular resolution comprising:
    providing a detector assembly, said detector assembly comprising at least one detector element having a front face and a rear face, wherein a space between the front face and the rear face of the detector element is filled with a plurality of regions of a first detector material and at least one region of a second detector material, and each region connects the front face to the rear face of the detector element, and wherein an energy deposition takes place in at least the regions of the first detector material as a function of an angle of incidence of the radiation on the detector element;
    recording a spectrum of the energy deposited in the first detector material in a first energy range;
    rotating the at least one detector element by at least an angle of rotation and recording a spectrum of the energy deposited in the first detector material in a first energy range for the respective angle of rotation; and
    comparing the energies recorded at different angles of rotation in the first energy region.

7. The method according to claim 6, further comprising:
    recording an energy deposited in the first detector material in at least a second energy range at a plurality of angles of rotation; and
    comparing the energy recorded in the first energy range and the second energy range for the plurality of angles of rotation.

8. A method for identifying nitrogen-containing explosives in material samples comprising:
    providing a detector assembly, said detector assembly comprising at least one detector element having a front face and a rear face, wherein a space between the front face and the rear face of the detector element is filled with a plurality of regions of a first detector material and at least one region of a second detector material, and each region connects the front face to the rear face of the detector element, and wherein an energy deposition takes place in at least the regions of the first detector material as a function of an angle of incidence of the radiation on the detector element;
    irradiating a material sample utilizing an excitation radiation source in such a way that nuclear excitations are produced in the material sample;
    recording a spectrum of the energy deposited in the first detector material in a first energy range;
    recording a spectrum of the total energy deposited in the first detector material;
    determining a first energy deposited in a first energy range;
    determining a second energy deposited in a second energy range; and
    comparing the first deposited energy with the second deposited energy for determining a direction of a nitrogen-containing radiation source in the material sample relative to the detector element.

9. The method according to claim 8, wherein said material samples are at least one of the group of: a luggage item, a land mine or a cargo.

10. A detector assembly for detecting radiation with angular resolution comprising:
   at least one detector element having a front face and a rear face;
   wherein a space between the front face and the rear face of the detector element is filled with a plurality of regions of a first detector material and at least one region of a second detector material, and each region connects the front face to the rear face of the detector element;
   wherein an energy deposition takes place in at least the regions of the first detector material as a function of an angle of incidence of the radiation on the detector element; and
   wherein at least the regions of the first or the second detector material each form a semiconductor detector in which electrical signals can be read.

11. The detector assembly according to claim 10, wherein the regions are formed as layers of the first detector material and the second detector material.

12. The detector assembly according to claim 10, wherein at least the regions of the first detector material are formed of a polyhedron, a cylinder or a prism with a base area and a height, the base areas bordering on the front and rear face of the detector element.

13. The detector assembly according to claim 10, wherein the first or the second detector material comprises an active detector material or a scintillator material.

14. The detector assembly according to claim 10, wherein the regions of the second detector material have an absorptive effect on the radiation or particles passing through the detector element.

15. The detector assembly according to claim 10, wherein the detector element comprises a light measurement means, which is coupled on the rear side at least to the regions of the first detector material and which integrally detects scintillation light from all regions of the first detector material.

16. The detector assembly according to claim 10, wherein the detector element is arranged so as to be rotatable about at least one axis of rotation, the axis of rotation being substantially perpendicular to a connection between the front face and the rear face.

17. The detector assembly according to claim 10, wherein the first and the second detector materials respond to gamma radiation at least in the energy range of Compton scattering or at a higher energy.

18. The detector assembly according to claim 10, further comprising a neutron source for irradiating a material sample with neutrons.

19. The detector assembly according to claim 10, comprising a plurality of detector elements, the detector elements being arranged about a position of a material sample in such a way that the front faces form a non-vanishing angle to one another.

20. The detector assembly according to claim 10, further comprising an evaluation means being coupled to the regions of the first and the second detector material and being operable to detect a distribution of the energies deposited in the detector materials.

* * * * *